United States Patent [19]

Nishimura et al.

[11] Patent Number: 5,450,264
[45] Date of Patent: Sep. 12, 1995

[54] MAGNETIC HEAD

[75] Inventors: Masaru Nishimura; Takeshi Terazawa, both of Hyogo; Naoto Sugawara, Fukushima, all of Japan

[73] Assignee: Mitsubishi Denki Kabushiki Kaisha, Tokyo, Japan

[21] Appl. No.: 336,167

[22] Filed: Nov. 8, 1994

Related U.S. Application Data

[62] Division of Ser. No. 80,877, Jun. 21, 1993, which is a division of Ser. No. 656,286, Feb. 14, 1991, abandoned.

[30] Foreign Application Priority Data

| Feb. 16, 1990 | [JP] | Japan | 2-33677 |
| Feb. 16, 1990 | [JP] | Japan | 2-33678 |
| Feb. 28, 1990 | [JP] | Japan | 2-47881 |
| Mar. 23, 1990 | [JP] | Japan | 2-74714 |
| Jul. 10, 1990 | [JP] | Japan | 2-184521 |

[51] Int. Cl.$^6$ .............................................. G11B 5/265
[52] U.S. Cl. .............................................. 360/121
[58] Field of Search .............................. 360/121, 118

[56] References Cited

U.S. PATENT DOCUMENTS

| 4,276,574 | 6/1981 | Baasch et al. | 360/121 |
| 4,720,757 | 1/1988 | Hatanai et al. | 360/121 |
| 4,786,991 | 11/1988 | Yamamori | 360/66 |
| 4,831,481 | 5/1989 | Toyoshima | 360/121 |

FOREIGN PATENT DOCUMENTS

| 0110513 | 6/1984 | European Pat. Off. |
| 36-39910 | 2/1961 | Japan |
| 59-152250 | 8/1984 | Japan |
| 61-209360 | 5/1986 | Japan |
| 60-3966 | 7/1986 | Japan |
| 61-165806 | 7/1986 | Japan |
| 61-90311 | 10/1986 | Japan |
| 61-275108 | 11/1986 | Japan |
| 63-129510 | 6/1988 | Japan |
| 62-139806 | 12/1988 | Japan |
| 63-304411 | 12/1988 | Japan |
| 2-31312 | 2/1990 | Japan |
| 1-182198 | 2/1990 | Japan |
| 596796 | 1/1948 | United Kingdom |
| 1142993 | 2/1969 | United Kingdom |
| 1263471 | 2/1972 | United Kingdom |
| WO83/01142 | 3/1983 | WIPO |

OTHER PUBLICATIONS

Patent abstract of Japan, vol. 5, No. 64 (p. 59) [736] Apr. 30, 1981.

*Primary Examiner*—Robert S. Tupper
*Attorney, Agent, or Firm*—Wolf, Greenfield & Sacks

[57] ABSTRACT

In a magnetic head comprising a read/write head and an erase head constructionally integrated with each other, the closed magnetic circuit of the erase head is arranged to be higher in magnetic reluctance than the closed magnetic circuit of the read/write head, whereby a magnetic flux to be drawn by the erase gap is reduced so as to prevent the leakage of the magnetic flux to the read/write head side.

9 Claims, 35 Drawing Sheets

F I G. 16
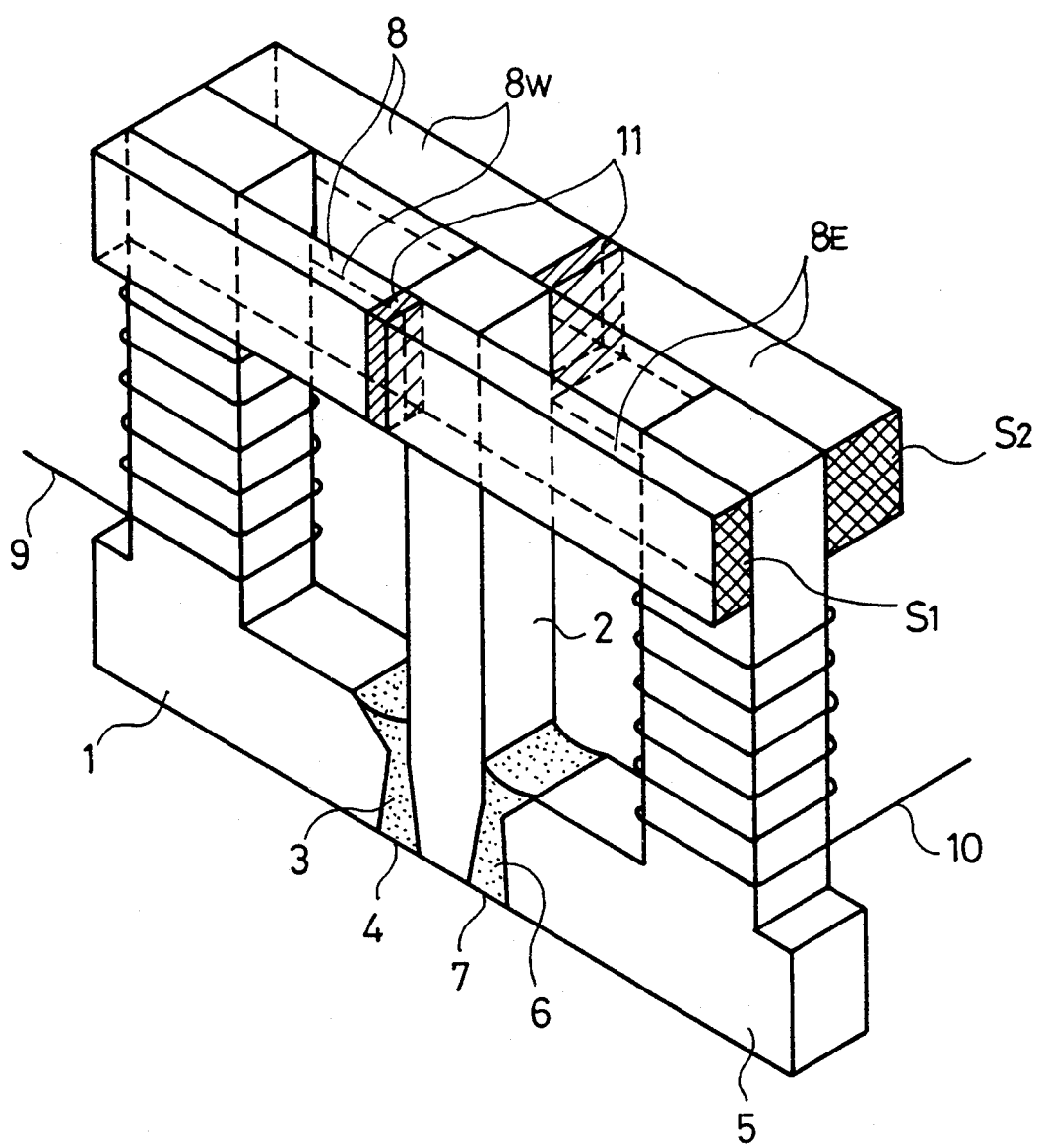

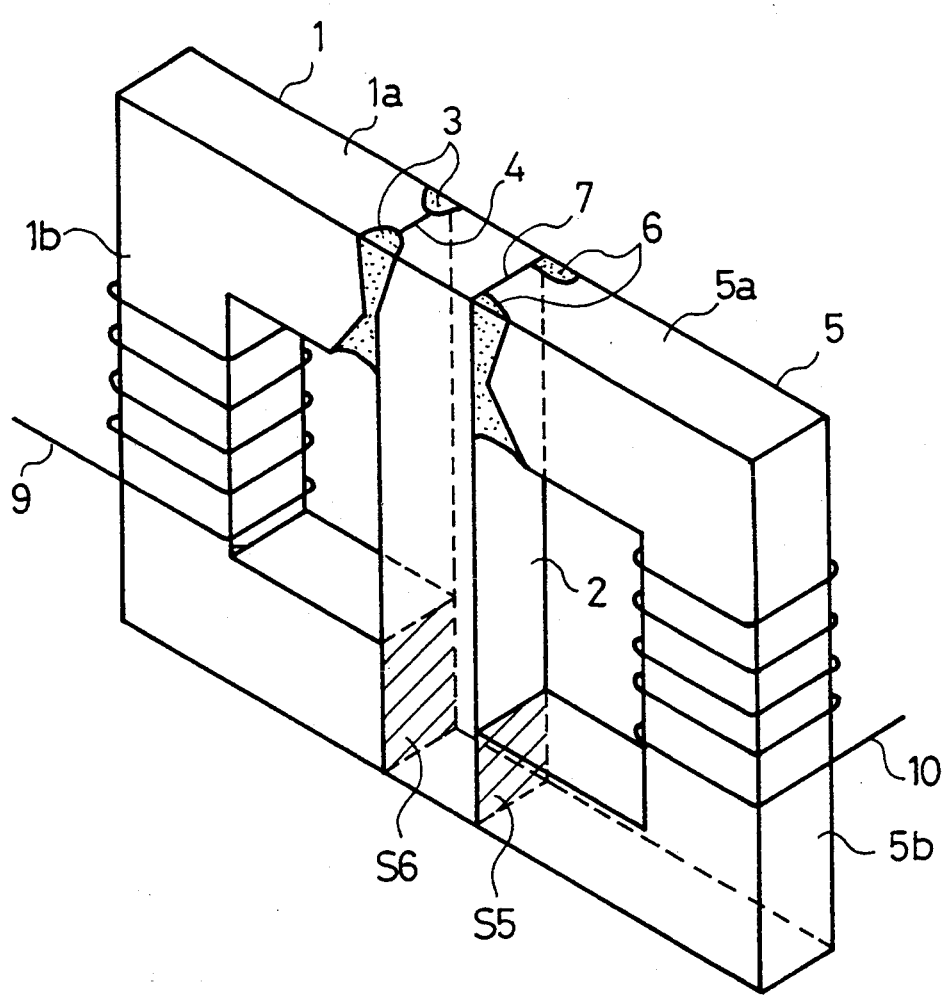
F I G. 28

MAGNETIC HEAD

This application is a divisional application Ser. No. 08/080,877, filed on Jun. 21, 1993 which is a divisional application of Ser. No. 07/656,286, filed Feb. 14, 1991, now abandoned.

BACKGROUND OF THE INVENTION

1. Field of the Invention

The present invention relates to magnetic heads for use in magnetic disk or flexible disk devices.

2. Description of the Prior Art

FIG. 48 is a perspective view of an arrangement of a conventional magnetic head such as disclosed in Japanese Patent Application Laid-Open No. 61-39910. In FIG. 48, numeral 1 represents a read/write core having a substantially T-shaped configuration and made of a magnetic material such as a Mn—Zn ferrite, and 2 designates a center core made of a magnetic material similar to that of the read/write core 1. This center core 2 is coupled to the read/write core 1 by a non-magnetic bonding material 3 such as a glass so as to form a read/write gap 4 between the center core 2 and the read/write core 1 on a medium-sliding surface 1a. Numeral 5 depicts an erase core having a substantially T-shaped configuration and made of a magnetic material such as Mn—Zn ferrite. This erase core 5 is coupled to the center core 2 by a non-magnetic bonding material 6 such as a glass so as to form an erase gap 7 therebetween on a medium-sliding surface 5a. Numeral 8 denotes a back core for closing the magnetic paths made by the read/write core 1, center core 2 and erase core 5, 9 designates a read/write coil wound around a leg 1b of the read/write core 1, 10 is an erase coil wound around a leg 5b of the erase core 5.

The conventional magnetic head shown in FIG. 48 is arranged by an integration of a read/write head formed with a closed magnetic circuit comprising the read/write core 1, back core 8 and center core 2, and an erase head formed with an closed magnetic circuit comprising the erase core 5, back core 8 and center core 2.

FIGS. 49(a) and 49(b) are a top plan view and an elevation side view for describing the flow of a magnetic flux when the magnetic head illustrated in FIG. 48 is taking the reproducing state, where parts corresponding to those in FIG. 48 are marked with the same numerals and characters and the detailed description thereof will be omitted. In the illustrations, ($\phi$R), ($\phi$R1), ($\phi$R2), ($\phi$R3) represent the magnetic fluxes of signals to be reproduced through the read/write gap 4, and ($\phi$E), ($\phi$E1), ($\phi$E2), ($\phi$E3) designate the magnetic fluxes signals to be reproduced through the erase gap 7.

A description will be made hereinbelow in terms of operation of the above-mentioned conventional magnetic head. In cases where data recorded on a medium (not shown) are reproduced by using the conventional magnetic head, the read/write gap 4 draws a slight leakage flux on the medium so as to form a closed loop of the magnetic fluxes ($\phi$R1) and ($\phi$R2) passing through the closed magnetic circuit comprising the read/write core 1, back core 8 and center core 2. Here, a portion of the drawn magnetic flux is leaked into the erase core 5 to become a leakage flux ($\phi$R3). At this time, the magnetic flux ($\phi$R1) passing through the read/write core 1 causes induction to the read/write coil 9 so that the reproduced data signal flows through the read/write coil 9. Further, at this time, in the case that the erase gap 7 is positioned on a track of data to be reproduced or a track adjacent thereto, the erase gap 7 similarly draws a slight leakage flux on the medium so as to form a closed loop of the magnetic fluxes ($\phi$E1) and ($\phi$E2) passing through the closed circuit comprising the erase core 5, back core 8 and center core 2, a portion thereof being leaked into the read/write core 1 to become a leakage flux ($\phi$E3).

According to the conventional magnetic head with the above-described arrangement, in the case of reproducing data recorded on a medium, the magnetic flux ($\phi$R1) drawn by the read/write gap 4 and the magnetic flux ($\phi$E3) drawn by the erase gap 7 respectively pass through the read/write core 1 so as to cause induction to the read/write coil 9 whereby a signal induced by a superimposed magnetic flux of the magnetic fluxes ($\phi$R1) and ($\phi$E3) passes through the read/write coil 9 to perform the reproduction. In this case, since the data drawn by the read/write gap 4 are generally different from the data drawn by the erase gap 7, the data drawn by the erase gap 7 result in noises on the reproduced signal from the read/write coil 9 to cause generation of errors and reduction of the margin, thereby lowering the reliability on the reproducing performance of the magnetic head.

SUMMARY OF THE INVENTION

It is therefore an object of the present invention to eliminate the aforementioned problems to provide a magnetic head which is capable of reducing the magnetic flux to be drawn by the erase gap to prevent the magnetic flux from being leaked to the read/write head side and to suppress the generation of errors and reduction of the margin, thereby increasing the performance and reliability.

A magnetic head according to the invention is arranged such that a closed magnetic circuit of the erase head has a greater magnetic reluctance as compared with a closed magnetic circuit of the read/write head.

Magnetic heads of the invention are arranged such that the core portions such as the erase core 11, the magnetic material portion of the center core 2 coupled to the erase core 11 or the magnetic material portion of the back core coupled to the erase core for forming the closed magnetic circuit of the erase head are made of an electrically conductive magnetic material or made of a magnetic material having a lower high-frequency magnetic permeability than that of the read/write core 1.

A magnetic head of the invention is arranged such that the magnetic reluctance of the magnetic material-made back core 8 at the erase head side is higher than the magnetic reluctance thereof at the read/write head side.

Further, the magnetic head is arranged such that the back core 8 is equipped with a non-magnetic spacer 111 for separation between the erase head and the read/write head and the spacer 111 is shifted toward the erase head side with respect to the center of the center core 2.

The magnetic head is further arranged such that the cross-sectional area of a portion or all of the erase-head side back core 8E which is perpendicular to the magnetic path is smaller than the cross-sectional area of the read/write-head side back core 8W which is also perpendicular to the magnetic path.

The magnetic head is further arranged such that the erase core 5 and the center core 2, and the center core 2 and the read/write core 1 are coupled through a plurality of back cores 8 to each other, the number of the back cores 8E at the erase head side being smaller than that of the back cores 8W at the read/write head side.

The magnetic head is further arranged such that the back core 8 is composed of two back cores 8E and 8W respectively positioned at the erase head and read/write head sides of the center core 2 with the spacer for the separation between the erase head and the read/write head being interposed therebetween, and the cross-sectional area of the back core 8W where the spacer is positioned at the read/write head side is smaller than that of the back core 8E where the spacer is positioned at the erase head side, the cross-sectional areas of the back cores 8W and 8E being perpendicular to the magnetic path.

The magnetic head is further arranged such that a portion or all of the surface of the erase-head side back core 8E is machined to be rougher as compared with the surface of the read/write core 8W.

The magnetic head is further arranged such that the coupling portion of the erase core to the back core 8E is machined to be rougher as compared with the coupling portion of the read/write core 1 to the back core.

The magnetic head is further arranged such that a non-magnetic gap 113 is formed at the coupling portion between the back core 8 and the erase core 5 or between the center core 2 and the erase-head side back core 8E of the back core, which is separated by means of the spacer into the erase head side and the read/write head side.

The magnetic head is further arranged such that the length of the magnetic path of the erase-head side back core 8E is longer than that of the read/write-head side back core 8W.

The magnetic head is further arranged such that the contact area of the coupling portion between the back core 8 and the erase core 5 is smaller than that of the coupling portion between the back core 8 and the read/write core 1.

A magnetic head according to the invention is arranged such that, without providing the back core to be coupled to the read/write core 1, the center core 2 and the erase core 5; the read/write head constructed with a closed magnetic circuit comprising the center core 5 and the read/write core 1 is integrally coupled to the erase head constructed with a closed magnetic circuit comprising the center core 2 and the erase core 5, and the coupling portion of the erase core 5 and the center core 2 is machined to be rougher as compared with the coupling portion of the read/write core 1 and the center core 2.

A magnetic head according to the invention is arranged such that a non-magnetic gap 113 is provided at the coupling portion between the erase core 5 and the center core 2.

A magnetic head according to the invention is arranged such that the contact area of the coupling portion between the erase core 5 and the center core 2 is smaller than that of the coupling portion between the read/write core 1 and the center core 2.

Magnetic heads according to the invention are arranged such that a spacer 211 made of an electrically conductive material is provided on the coupling surface of the erase core 5 and the back core 8, the coupling surface of an erase E-shaped core 5 and the center core 2, in the erase core 5 or the erase head closed magnetic circuit such as a portion of the back core 8 between the coupling surface to the erase core 5 and the coupling surface to the center core 2 so as to cross the passing magnetic flux.

A magnetic head according to the invention is arranged such that a spacer 311, being made of a non-magnetic material or a magnetic material whose magnetic permeability is lower than that of the cores, is provided in the closed magnetic circuit of the erase head so as to cross the passing magnetic flux.

In the magnetic head according to the invention, since the closed magnetic circuit of the erase head is greater in magnetic reluctance than the closed magnetic circuit of the read/write head, the leakage of the signal reproduced by the erase head to the read/write head can be reduced.

In the magnetic heads according to the invention, since the core portions of the erase head which form the closed magnetic circuit of the erase head is made of a magnetic material whose high frequency magnetic permeability is lower or made of an electrically conductive magnetic material, when the magnetic flux of the high frequency reproduced signal drawn by the erase gap 7 passes through the core portions, this magnetic flux is attenuated due to, for instance, generation of an eddy current therein or others, thereby preventing the leakage of the leakage magnetic flux into the read/write head.

In the magnetic head according to the invention, the magnetic reluctance of the back core 8 at the erase head side is arranged to be higher than the magnetic reluctance thereof at the read/write head side, whereby the reproduction efficiency of the erase head can be lowered so as to reduce the leakage of the signal, reproduced by the erase head, into the read/write head.

In the magnetic heads according to the inventions, the coupling portion between the erase core 5 and the center core 2 is equipped with a means for making higher the erase-head side magnetic reluctance as compared with the read/write-head magnetic reluctance, whereby the reproduction efficiency of the erase head can similarly be lowered so as to prevent the leakage of the signal, reproduced by the erase head, into the read/write head.

In the magnetic heads according to the invention, since the spacer 211 made of an electrically conductive material is provided in the closed magnetic circuit of the erase head so as to cross the passing magnetic flux, when the high frequency magnetic flux of the data signal drawn by the erase head passes through the spacer 211 made of the electrically conductive material and provided in the magnetic circuit, there is generated an eddy current which produces a magnetic flux to cancel the magnetic flux in the magnetic circuit, thereby preventing the leakage of the leakage magnetic flux into the read/write head.

In the magnetic head according to the invention, a spacer 311, being made of a non-magnetic material or a magnetic material whose magnetic permeability is lower than that of the cores, is provided on the coupling surface of the erase core 5 and the back core 8, the coupling surface of an erase core 5 and the center core 2, in the erase core 5 or the erase head closed magnetic circuit such as a portion of the back core 8 between the coupling surface to the erase core 5 and the coupling surface to the center core 2 so as to cross the passing magnetic flux. Thus, the magnetic reluctance of the magnetic circuit of the erase head becomes high so as to reduce the reproduction efficiency, thereby preventing the leakage of the signal, reproduced by the erase head, into the read/write head.

The above and other objects, features, and advantages of the invention will become more apparent from the following description when taken in conjunction with the accompanying drawings.

BRIEF DESCRIPTION OF THE DRAWINGS

FIG. 16 is a perspective view showing a magnetic head according to an embodiment of the invention;

FIG. 28 is a perspective view showing a magnetic head according to an embodiment of the invention;

FIGS. 39(a) and 39(b) are, respectively, top plan view and elevation side view schematic diagrams for describing the flow of the magnetic flux in the reproducing process of the magnetic head shown in FIG. 38;

Figure 48:
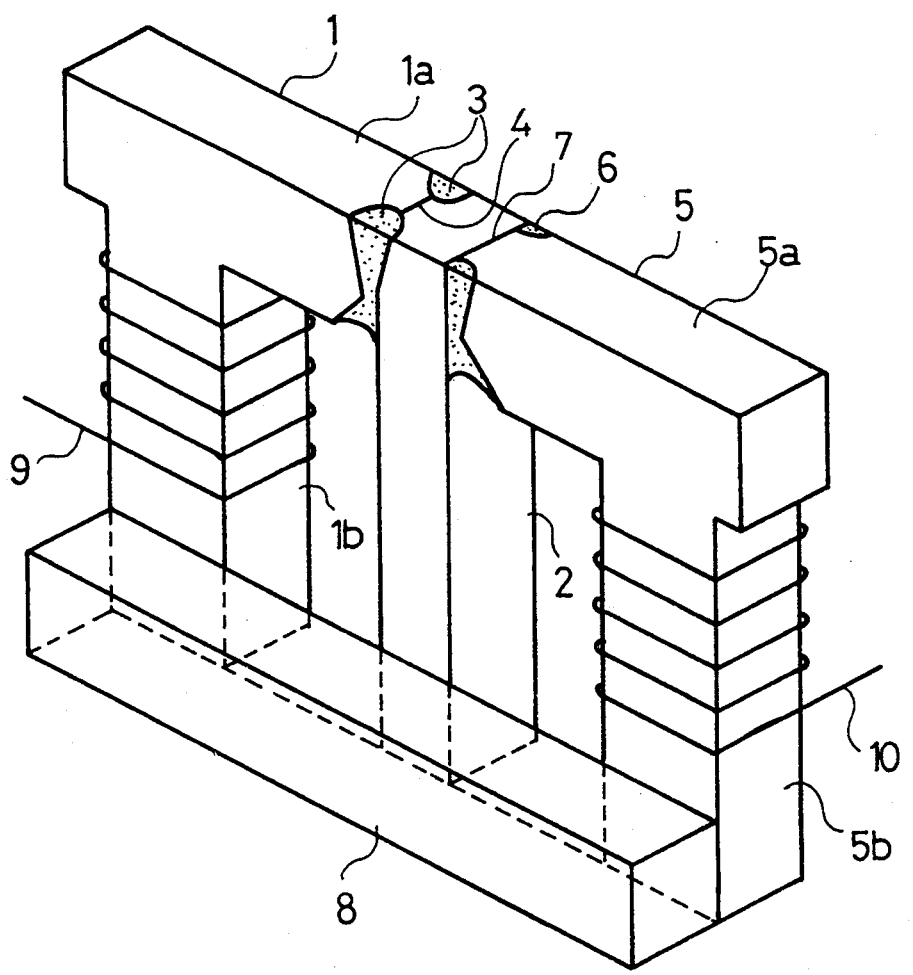
FIG. 48 is a perspective view showing a conventional magnetic head.

49(a) and 49(b) are top plan view and elevation side view schematic illustrations for the flow of the magnetic flux in the reproducing process of the magnetic head shown in FIG. 48.

DESCRIPTION OF THE PREFERRED EMBODIMENTS

Figure 1:
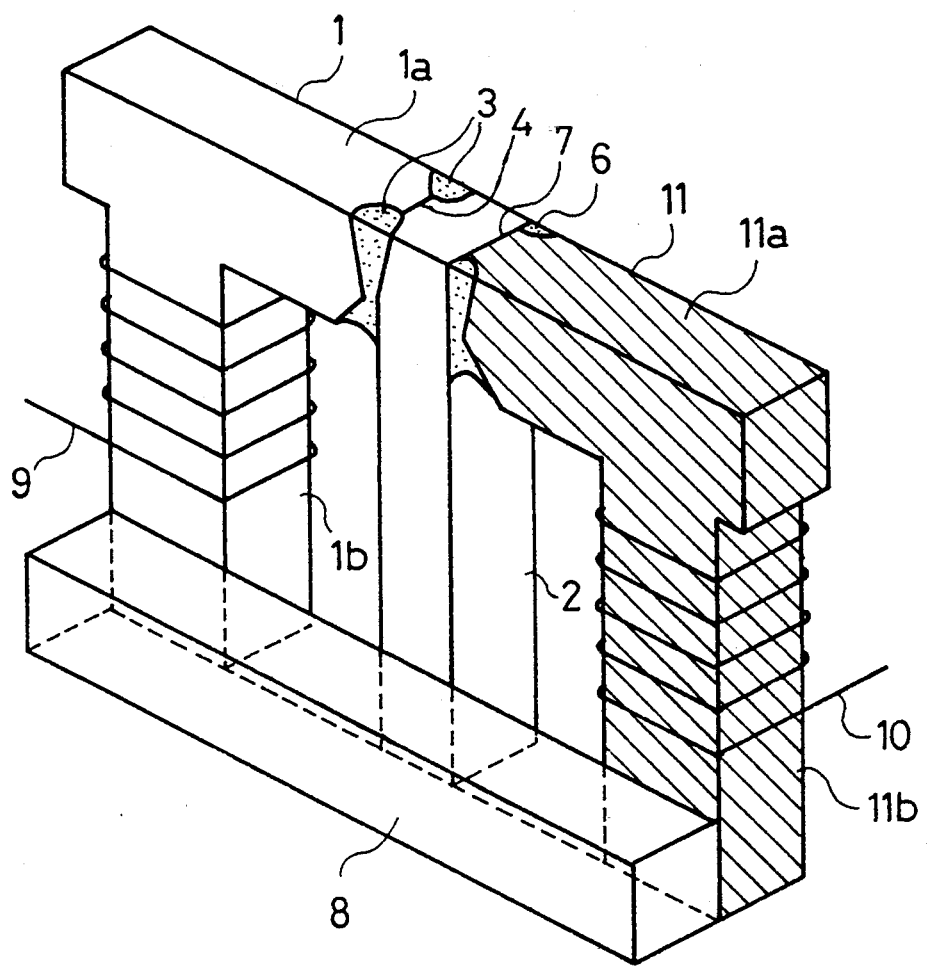
FIG. 1 is a perspective view showing a magnetic head according to an embodiment based on the invention.
Figure 2A:
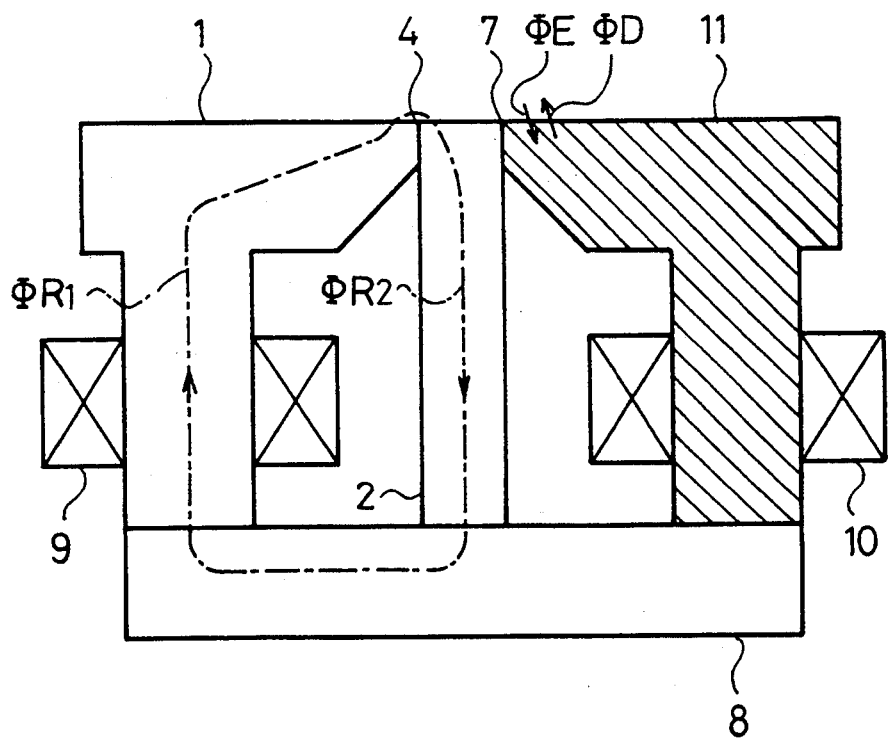
FIGS. 2(a) and 2(b) are an elevation side view and a top plan view schematic illustrations for describing the flow of the magnetic flux in the reproducing process of the magnetic head according to the embodiment based on the invention.
Figure 2B:
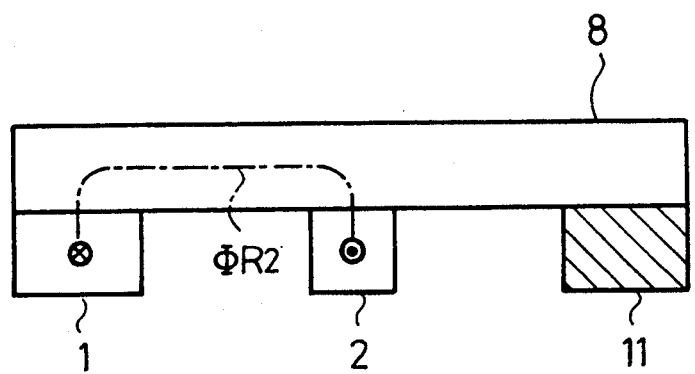

FIG. 1 is a perspective view showing a magnetic head according to the invention. FIGS. 2(a) and 2(b) are schematic diagrams for describing the reproducing process of the FIG. 1 magnetic head where (a) is a front elevation view and (b) is a bottom view. In FIGS. 1, 2(a) and (b), 1 represents a read/write core made of a magnetic material, 1a designates a medium-sliding surface, 1b depicts a leg portion thereof, 2 denotes a center core made of a magnetic material, 3 is a non-magnetic coupling member, 4 represents a read/write gap, 6 designates a non-magnetic coupling member, 7 depicts an erase gap, 8 is a back core made of a magnetic material, 9 represents a read/write coil, anti 10 is an erase coil. These parts are similar to those in FIG. 48, represents an erase core corresponding to the erase core illustrated at numeral 5 in FIG. 48, the erase core 11 being made of a magnetic material such as a nickel-zinc (NiZn) ferrite having a low high frequency magnetic permeability, or made of an electrically conductive magnetic material such as a ferrite including a carbon. Further, 11a represents a medium-sliding surface thereof and 11b designates a leg portion thereof.

A description will be made hereinbelow in terms of operation. Since in this embodiment the erase core 11 is made of a magnetic material having a low high-frequency magnetic permeability or made of an electrically conductive magnetic material, even if in reproduction a slight leakage magnetic flux $\phi E$ presented on the medium is drawn by the erase gap 7, when passing through the erase core 11, the magnetic flux which is a high frequency magnetic flux obtained by reproducing the data signal is attenuated due to the low magnetic permeability of the erase core 11 or cancelled because of generation of a magnetic flux $\phi D$ in a direction that blocks the passing magnetic flux $\phi E$ due to an eddy current caused by its electrical conductivity. As a result, it is possible to prevent the leakage to the read/write core 1 side as illustrated in FIGS. 2(a) and (b).

Here, in the erasing operation, the erasing magnetic flux produced by the erase coil 10 is a direct-current magnetic flux whereby the erase core 11 has a high magnetic permeability, and further the eddy current is not generated, thereby perform the same erasing operation as in the conventional magnetic head.

Figure 3:
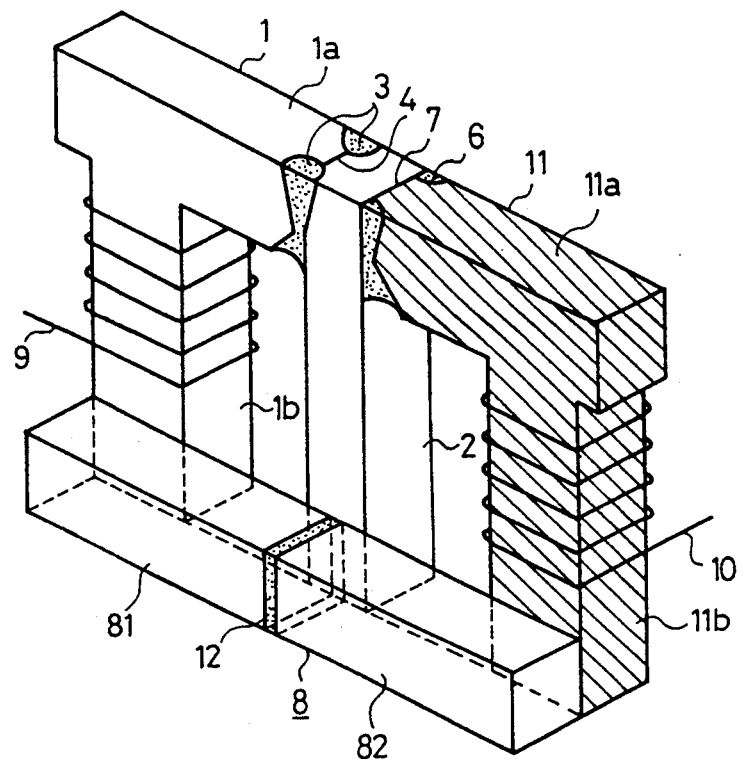
FIGS. 3 to 6 are perspective views showing a magnetic head according to another embodiment based upon the invention.
Figure 4:
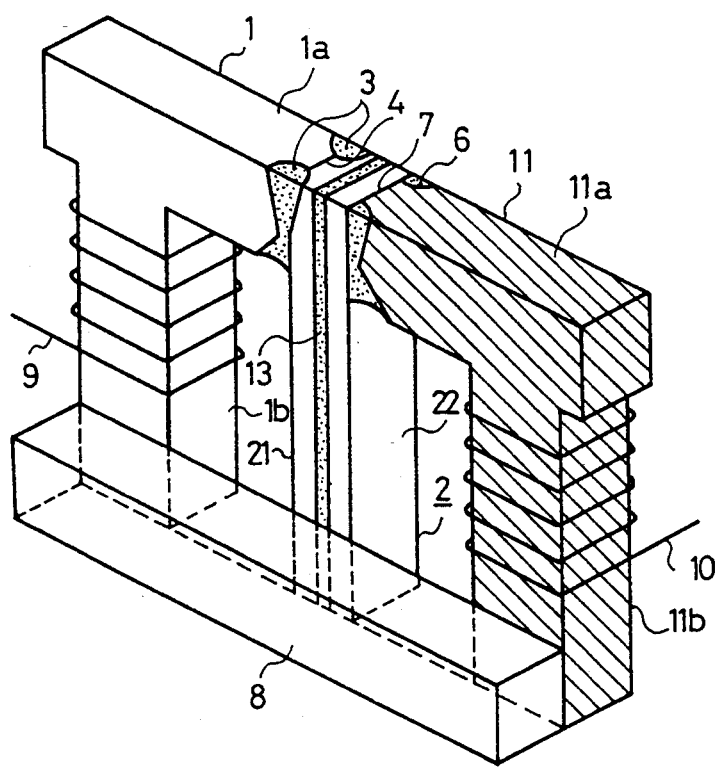
Figure 5:
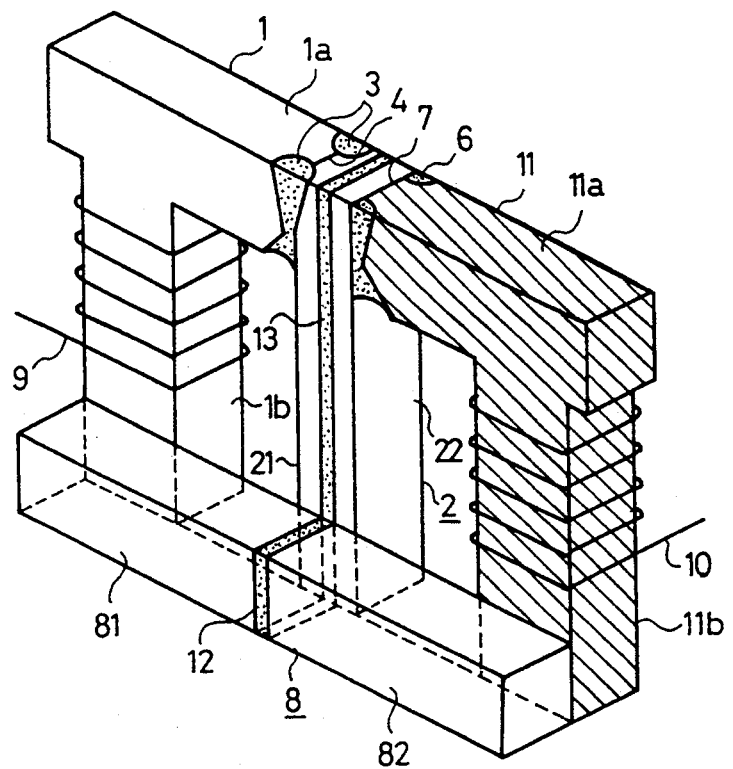
Figure 6:
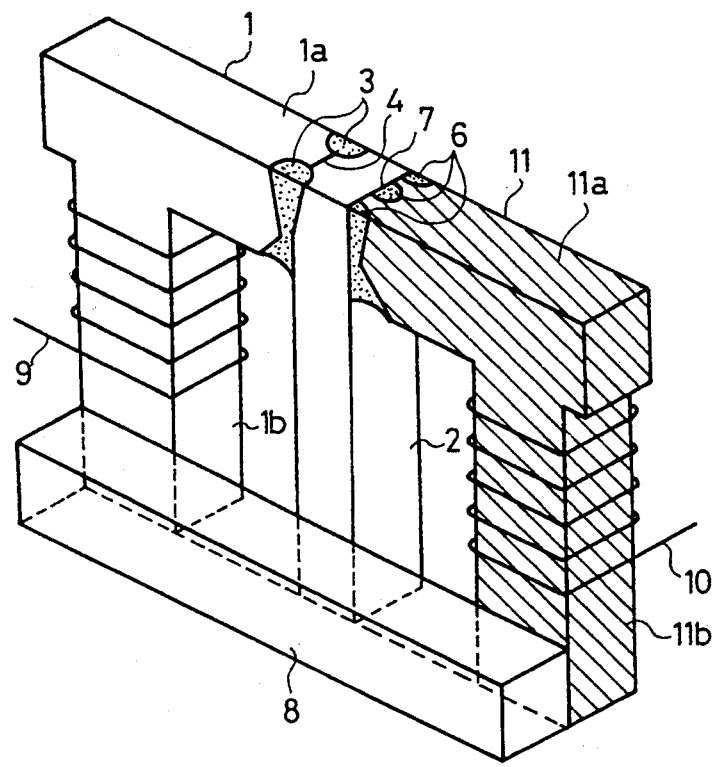

FIGS. 3 to 6 are perspective views showing further embodiments of the invention. FIG. 3 shows the embodiment in which a non-magnetic spacer 12 such as a glass is provided in the back core 8 so as to magnetically separate it into a magnetic material section 81 for forming a closed magnetic circuit of the read/write magnetic flux and a magnetic material section 82 for forming a closed magnetic circuit of the erase magnetic flux. FIG. 4 shows the embodiment in which a non-magnetic spacer 13 such as a glass is provided in the center core 2 so as to magnetically separate it into a magnetic material section 21 for forming a closed magnetic circuit of the read/write magnetic flux and a magnetic material section 22 for forming a closed magnetic circuit of the erase magnetic flux. FIG. 5 shows the embodiment where the center core 2 and the back core 8 are divided by non-magnetic spacers 12 and 13 so as to form magnetic material sections 21, 81 for forming a closed magnetic circuit of the read/write magnetic flux and further to form magnetic material sections 22, 82 for forming a closed magnetic circuit of the erase magnetic flux, respectively. FIG. 6 shows embodiment where the erase gap 7 is not constructed as an advance erasing type gap employed for the above-mentioned embodiments but constructed as a tunnel erasing type gap. These embodiments have the same effect as the embodiment illustrated in FIG. 1.

Figure 7:
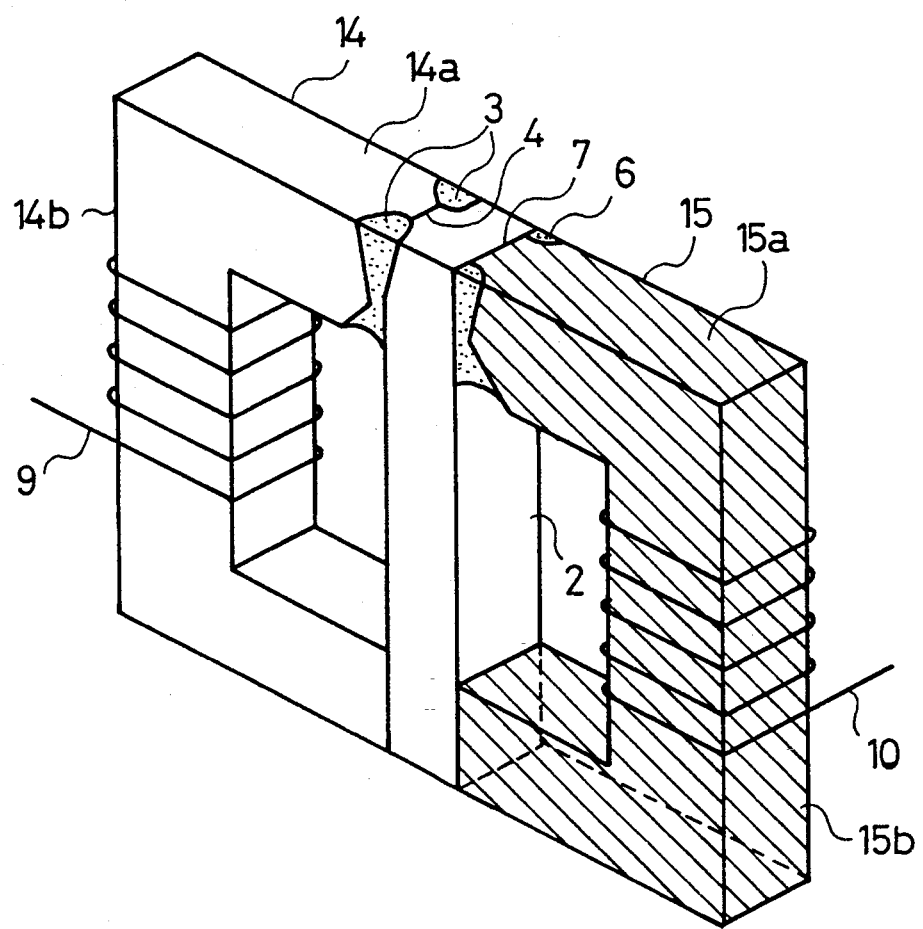
FIGS. 7 to 9 are perspective views showing a magnetic head according to an embodiment based on the invention.
Figure 8:
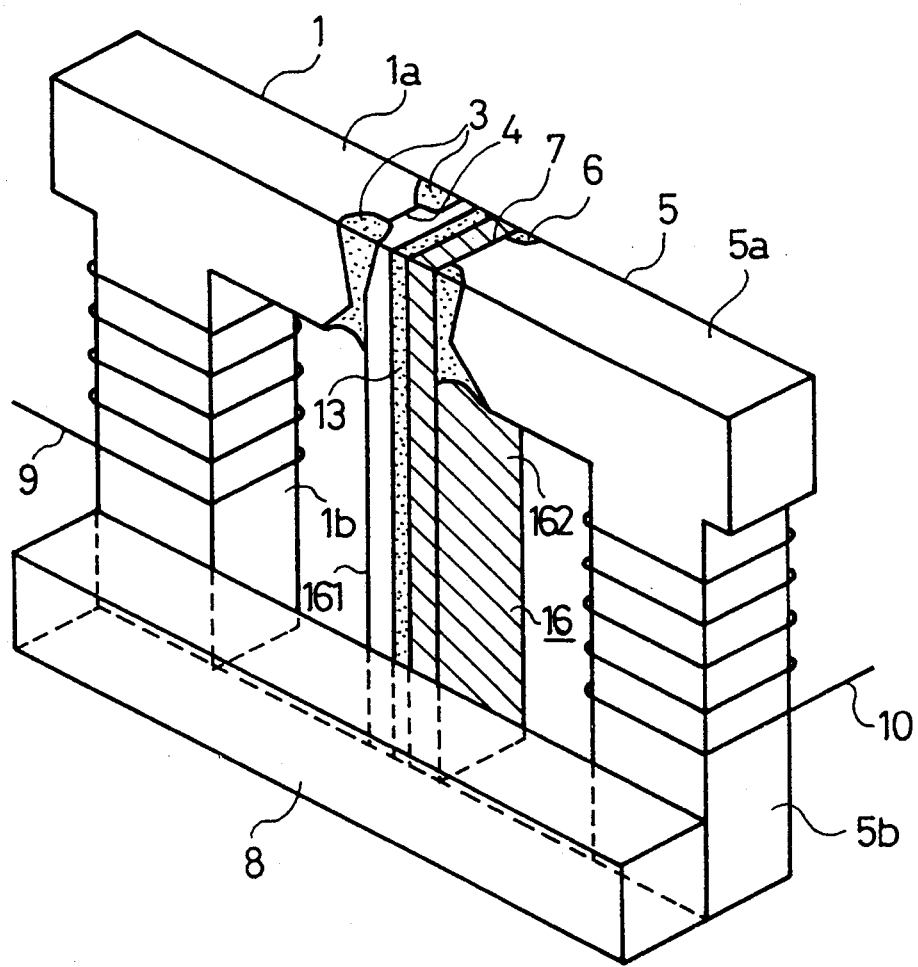
Figure 9:
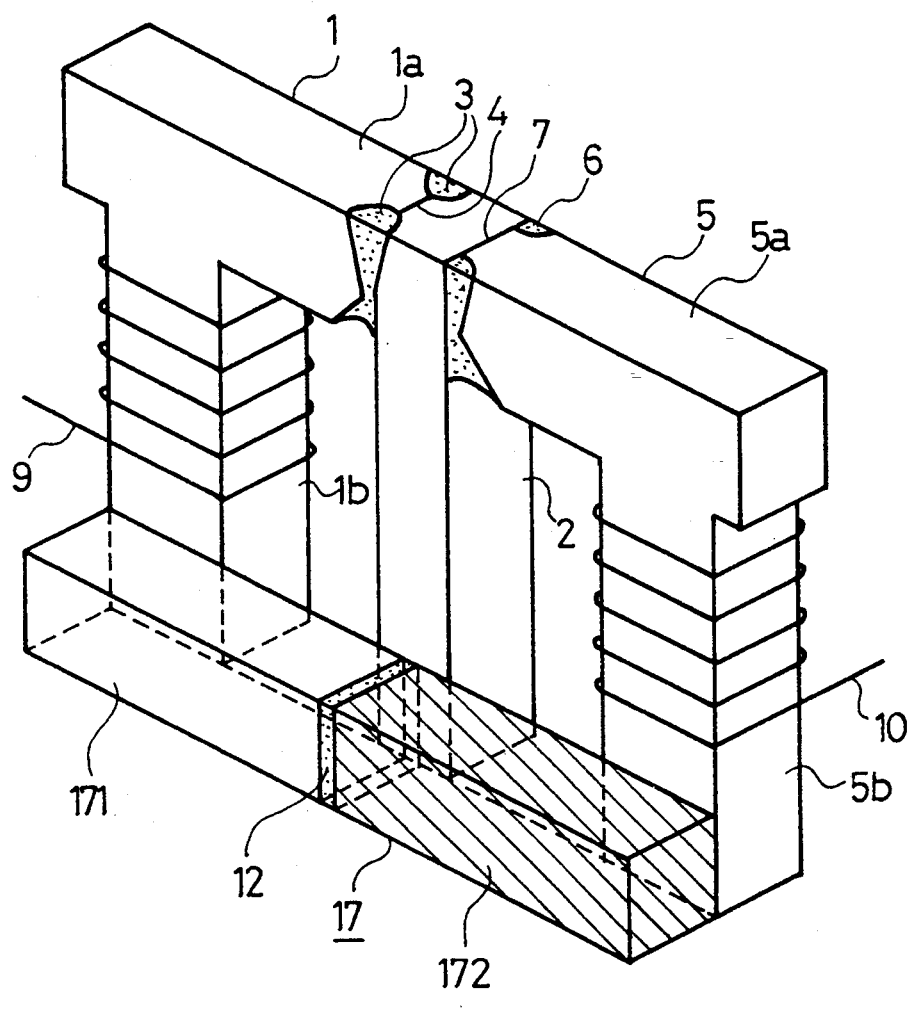

FIGS. 7 to 9 are perspective views showing embodiments of the invention. FIG. 7 shows the second-claimed embodiment of the invention in which the read/write core 14 and the erase core 15 are not formed so as to have T-shaped configurations as described above, but formed so as to have E-shaped configurations to omit the back core 8, and further the erase core 15 is made of a magnetic material having a low high-frequency magnetic permeability or made of an electrically conductive magnetic material. FIG. 8 illustrates the fourth-claimed embodiment of the invention where the center core 16 is divided by means of a non-magnetic spacer 13 into a magnetic material section 161 magnetically coupled to the read/write core 1 and a magnetic material section 162 magnetically coupled to the erase core 5, and the magnetic material sectorial 162 magnetically coupled to the erase core 5 is made of n magnetic material having a low high-frequency magnetic permeability or made of an electrically conductive magnetic material. FIG. 9 illustrates the embodiment in which the back core 17 is divided by a non-magnetic spacer 12 into a magnetic material section 171 magnetically coupled to the read/write core 1 and a magnetic material section 172 magnetically coupled to the erase core 5, and further the magnetic material section 172 magnetically coupled to the erase core 5 is made of a magnetic material having a low high-frequency magnetic permeability or made of an electrically conductive magnetic material.

According to the above-described embodiments, since the core portions such as the erase core, magnetic material section of the center core coupled to the erase core and magnetic section of the back core coupled to the erase core for forming the closed magnetic circuit of the erase head are made of a magnetic material having a lower high-frequency magnetic permeability than the read/write core or made of an electrically conductive material, the magnetic flux to be drawn by the erase gap and leaked to the read/write head is attenuated to provide magnetic heads with a high reliability which is capable of reproducing a signal with less noises so as not to have the possibility of generation of errors and lowering of the margin.

Figure 10:
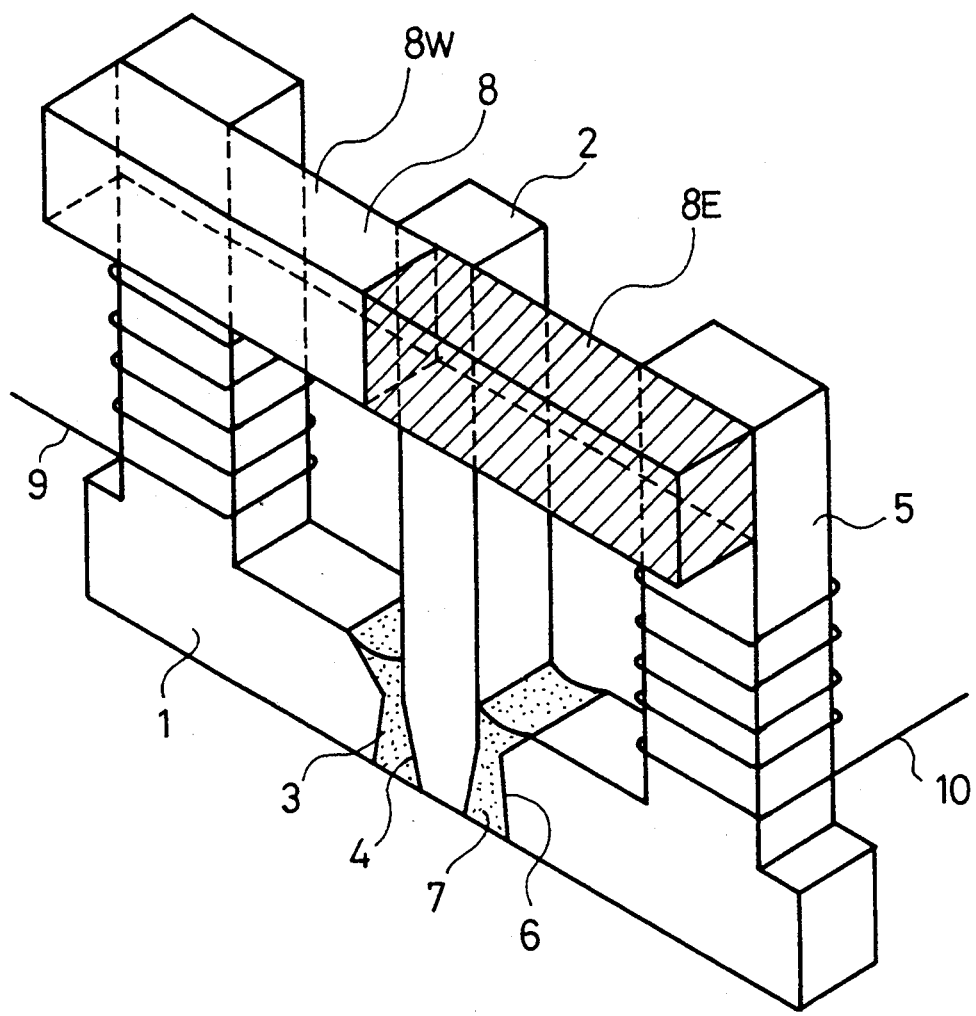
FIG. 10 is a perspective view showing the conception of a magnetic head according to the invention.
Figure 11:
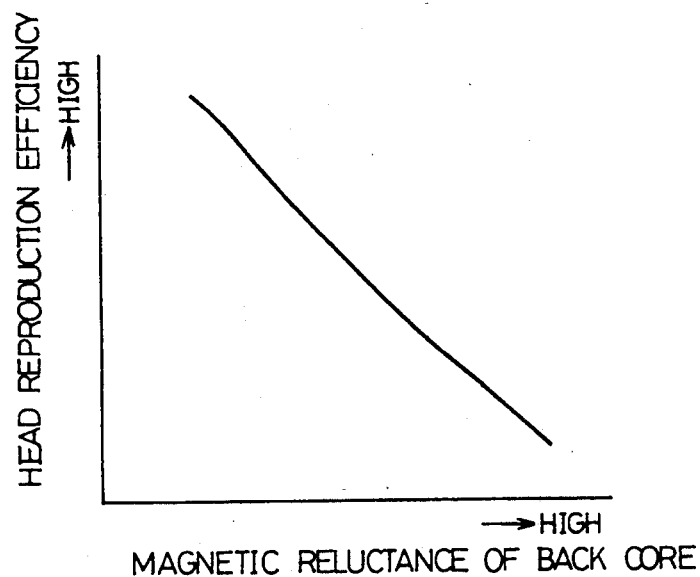
FIGS. 11, 12(a) and 12(b) are illustrations for describing the operation of the magnetic head shown in FIG. 10.
Figure 12A:
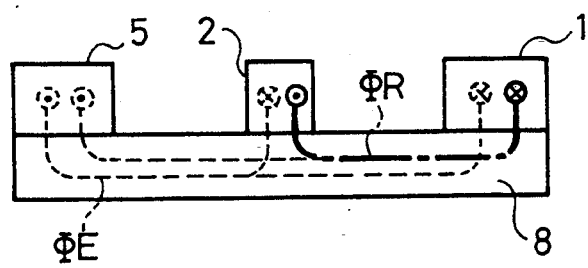
Figure 12B:
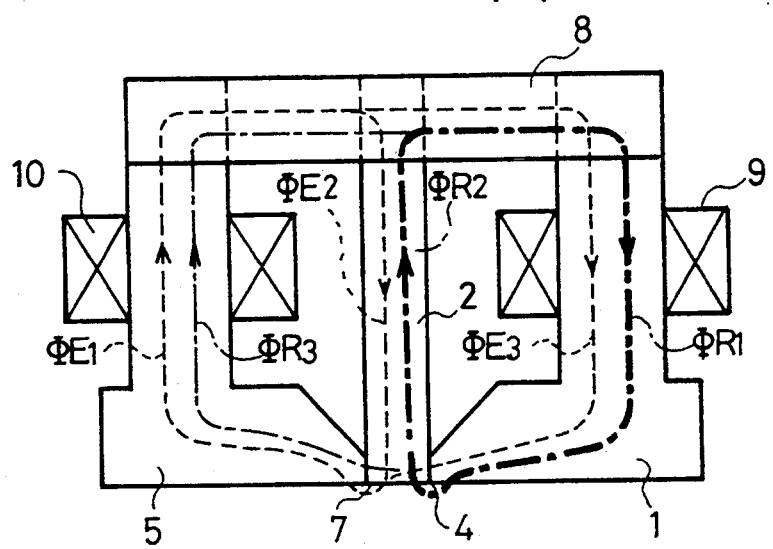

FIG. 10 is a perspective view showing a magnetic head according to an embodiment of the invention, and FIGS. 11, 12(a) and 12(b) are illustrations for describing the operation of this embodiment. In FIG. 10, 8E represents an erase-head side back core and 8W designates a read/write-head side back core.

Operation will be described hereinbelow. In FIG. 10, the magnetic reluctance R1 of the erase-head side back core 8E of the back core 8 coupled to an erase core 5, an center core 2 and a read/write core 1 to form a closed magnetic circuit, which cores are made of a magnetic material such as a Mn—Zn ferrite, is arranged to be higher than the magnetic reluctance R2 of the read/write-head side back core 8W thereof. With this arrangement, as illustrated in FIG. 11, the reproduction efficiency of the erase head is lowered, whereby the magnetic flux $\phi E$ drawn by an erase gap 7 in reproduction is reduced and the magnetic flux $\phi E3$ in FIG. 12(b) which is leaked into the read/write head is more reduced as compared with the magnetic flux $\phi E3$ in FIG. 49(b). Thus, as illustrated in FIG. 12(a) and 12(b), the read/write core 1 is occupied with time magnetic flux $\phi R$ of the reproduction signal drawn by a read/write gap 4, which is in turn interlinked with a read/write coil 9.

Here, in the erasing operation, the magnetomotive force to be applied to the erase head is arranged to be greater as compared with a conventional magnetic head, thereby ensuring the same effect as the conventional a magnetic head.

Figure 13:
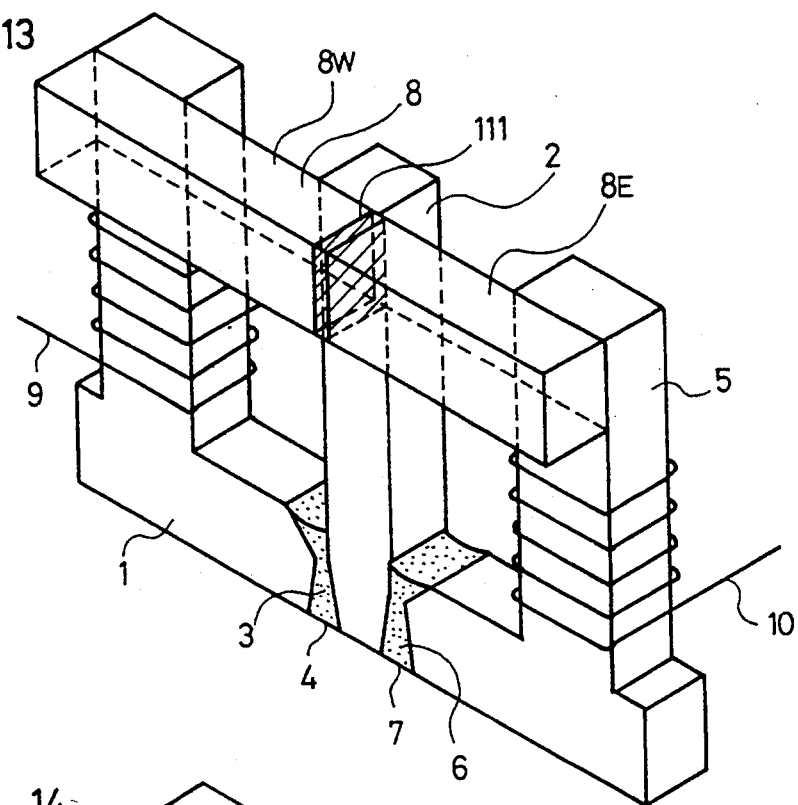
FIG. 13 is a perspective view showing a magnetic head according to an embodiment of the invention.

FIG. 13 shows a detailed arrangement of such a magnetic head. In FIG. 13, a non-magnetic spacer 111 such as a glass is provided in the back core 8 so as to effect, the separation between the erase head and the read/write head, and the spacer 111 is shifted to the erase head side with respect to the center of the center core 2 whereby the magnetic reluctance of the erase head side becomes great so as to lower the reproduction efficiency. As a result, the magnetic flux $\phi E$ to be drawn by the erase gap 7 in reproduction is reduced and hence the magnetic flux $\phi E3$ to be leaked into the read/write head is also reduced.

Figure 14:
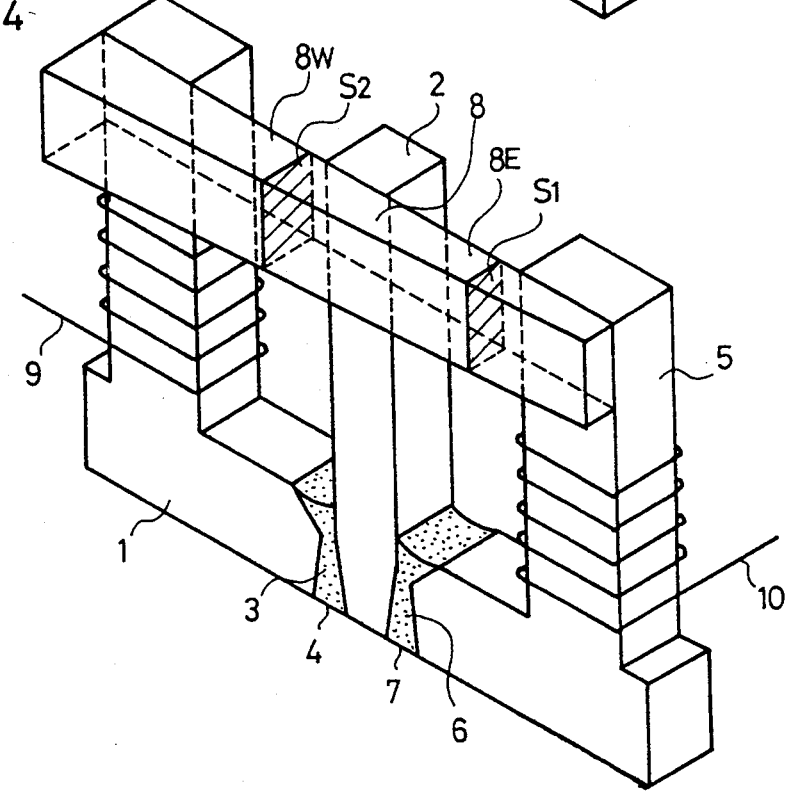
FIG. 14 is a perspective view showing a magnetic head according to an embodiment of the invention.

FIG. 14 shows an another embodiment in which the cross-sectional area S1 of a portion or entire of the erase-head side back core 8E which crosses the magnetic path is arranged to be smaller than the cross-sectional area S2 of the read/write-head side back core 8W which also crosses the magnetic path. Thus, similarly, the magnetic reluctance of the erase head side becomes high so as to lower the reproduction efficiency, whereby the magnetic flux $\phi E$ to be drawn by the erase gap 7 in reproduction is reduced so as to reduce the magnetic flux $\phi E3$ to be leaked into the read/write head.

Figure 15:
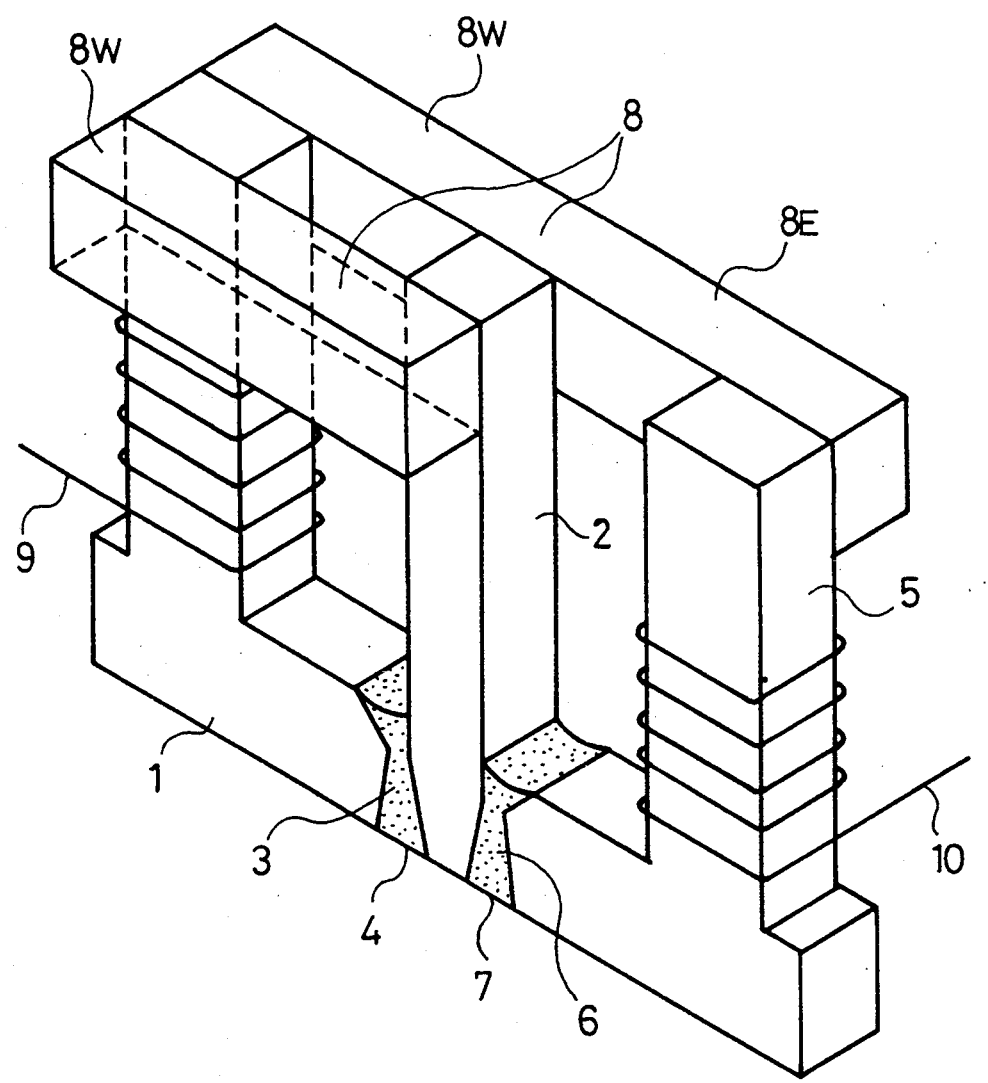
FIG. 15 is a perspective view showing a magnetic head according to an embodiment of the invention.

Further, as illustrated in FIG. 15, the erase core 5 and center core 2, the center core 2 and read/write core 1 are respectively coupled to each other through a plurality of back cores 8, and the number of the erase-head side back cores 8E is arranged to be smaller than the number of the read/write-head side back cores 8W. This also allows increase in the magnetic reluctance of the erase head. Thus, the reproduction efficiency can be reduced so that the magnetic flux $\phi E$ to be drawn by the erase gap 7 reproduction is reduced so as to reduce the magnetic flux $\phi E3$ to be leaked into the read/write head.

FIG. 16 shows a further embodiment in which two back cores 8 are provided which respectively have at the erase-head side and read/write-head side of the center core 2 non-magnetic spacers 111 such as glass formed so as to separate the back cores 8 into the erase head sides and the read/write sides. The cross-sectional area S1 of the back core 8 of which the spacer 111 is positioned at the read/write-head side is arranged to be smaller than the cross-sectional area S2 of the back core 8 of which the spacer 111 is positioned at the erase-head side, the cross-sectional areas S1 and S2 crossing the magnetic paths. Thus, the magnetic reluctance of the erase head become high so as to lower the reproduction efficiency whereby the magnetic flux $\phi E$ to be drawn by the erase gap 7 in reproduction can be reduced so as to reduce the magnetic flux $\phi E3$ to be leaked into the read/write t-lead.

Figure 17:
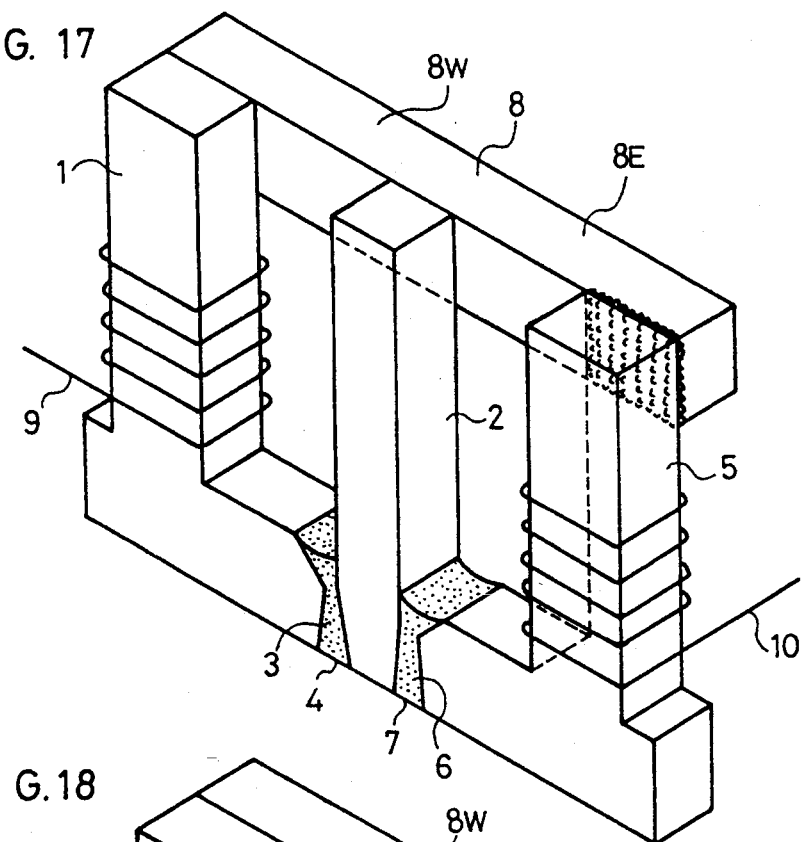
FIGS. 17 and 18 are perspective views showing a magnetic head according to an embodiment of the invention
Figure 18:
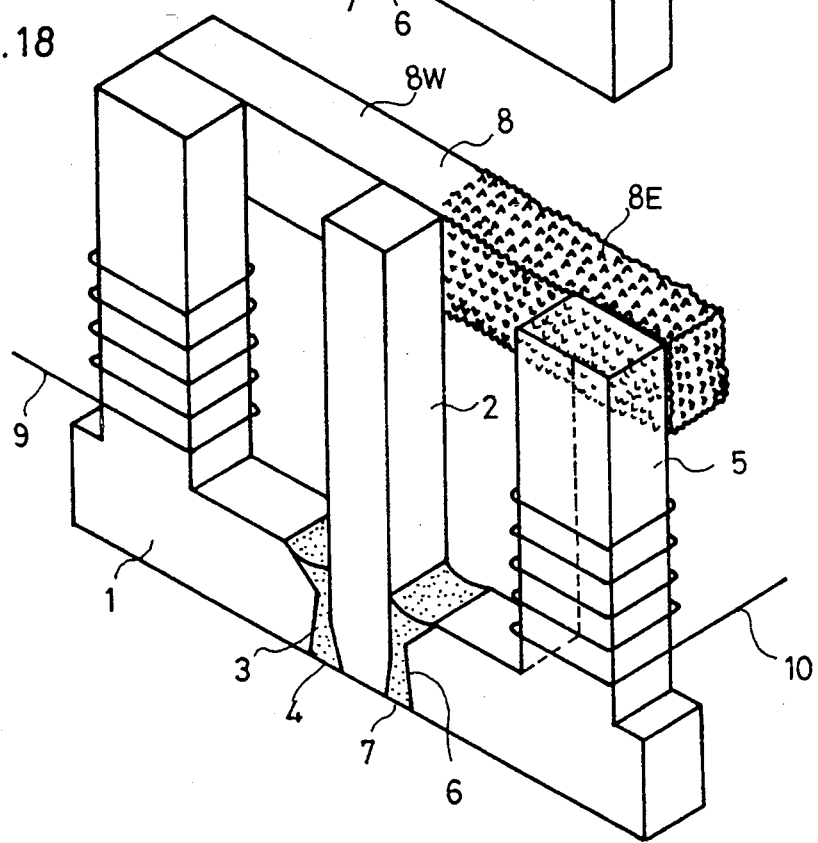

In FIGS. 17 and 18, a portion (the coupling portion to the erase core) or all of the surface of the erase-head side back core 8E is machined to be rougher as compared with the surface of the read/write core 1 so as to increase the magnetic reluctance of the erase head.

Figure 19:
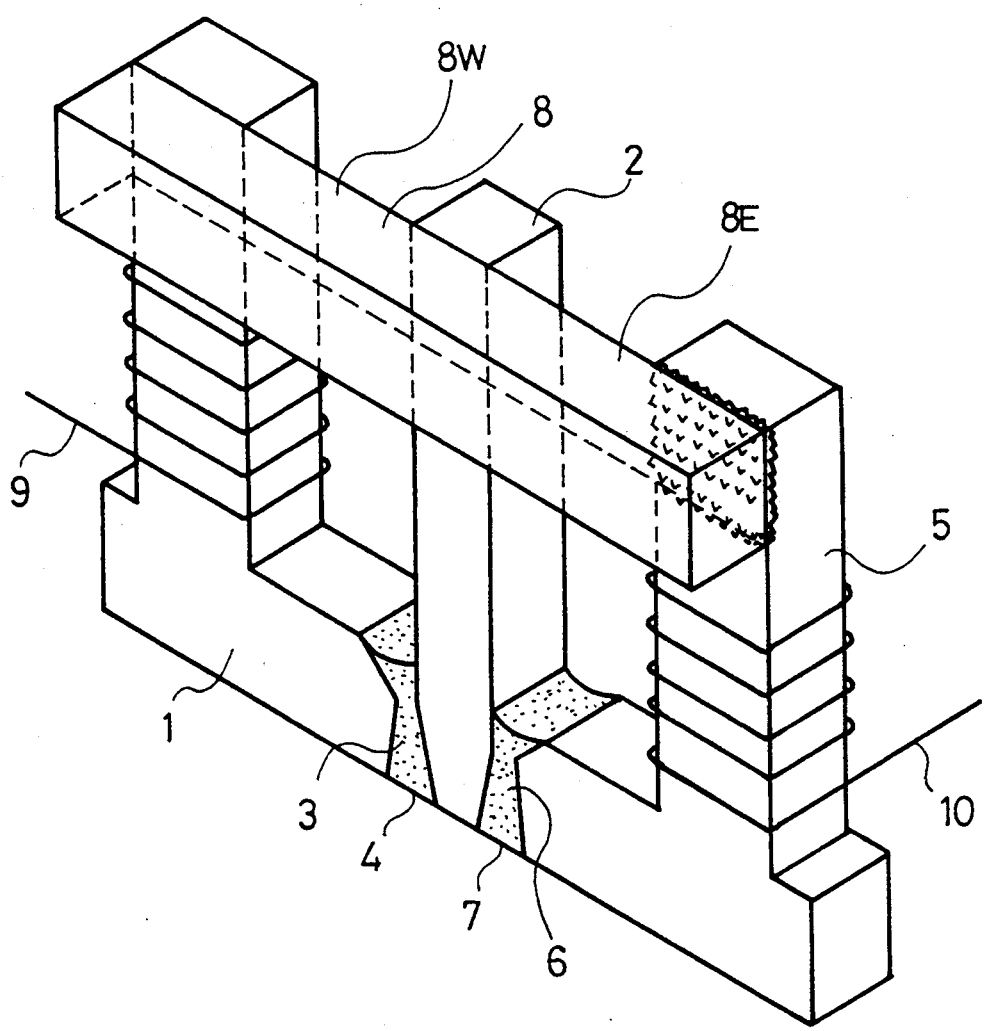
FIG. 19 is a perspective view showing a magnetic head according to an embodiment of the invention.

In FIG. 19, the coupling portion of the erase core 5 to the back core 8E is machined to be rougher than the read/write core 1, whereby the magnetic reluctance off the erase head can be heightened.

Figure 20:
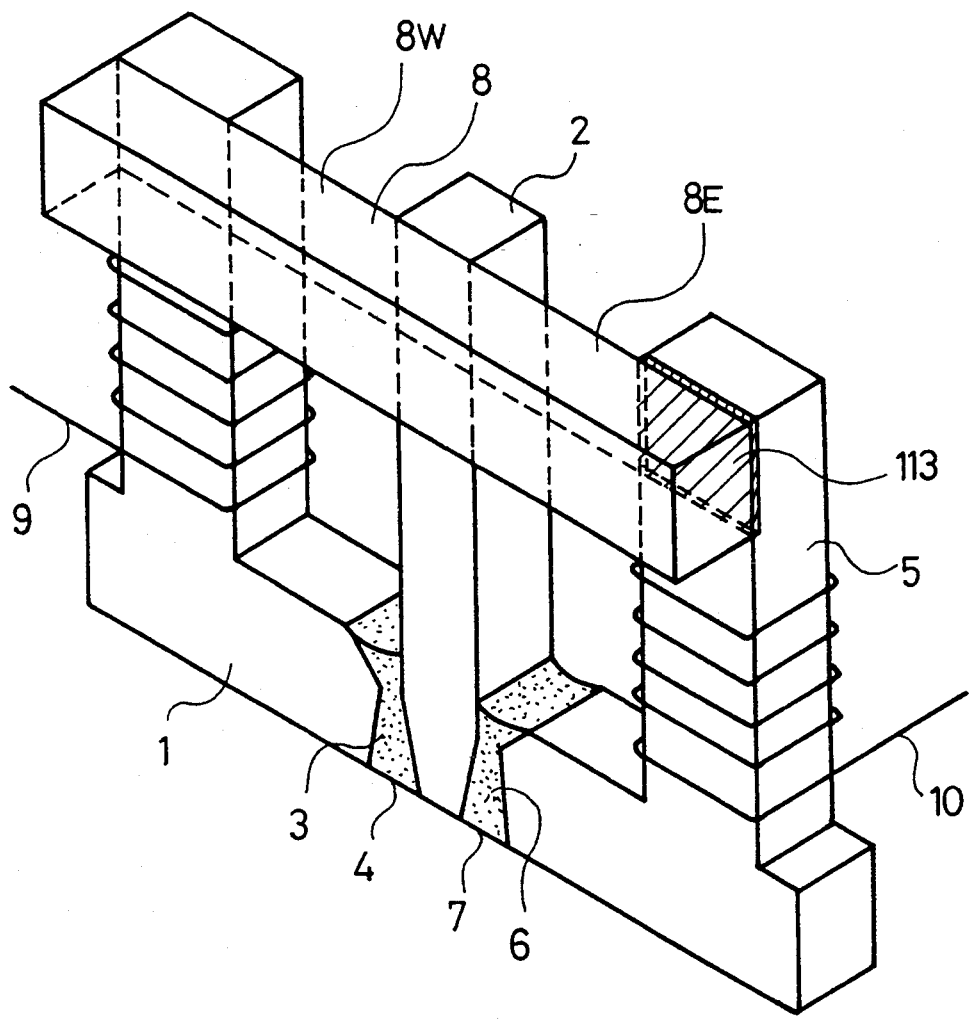
FIGS. 20 and 21 are perspective views showing a magnetic head according to an embodiment of the FIGS. 22 and 23 are perspective views showing a magnetic head according to an embodiment of the invention.
Figure 21:
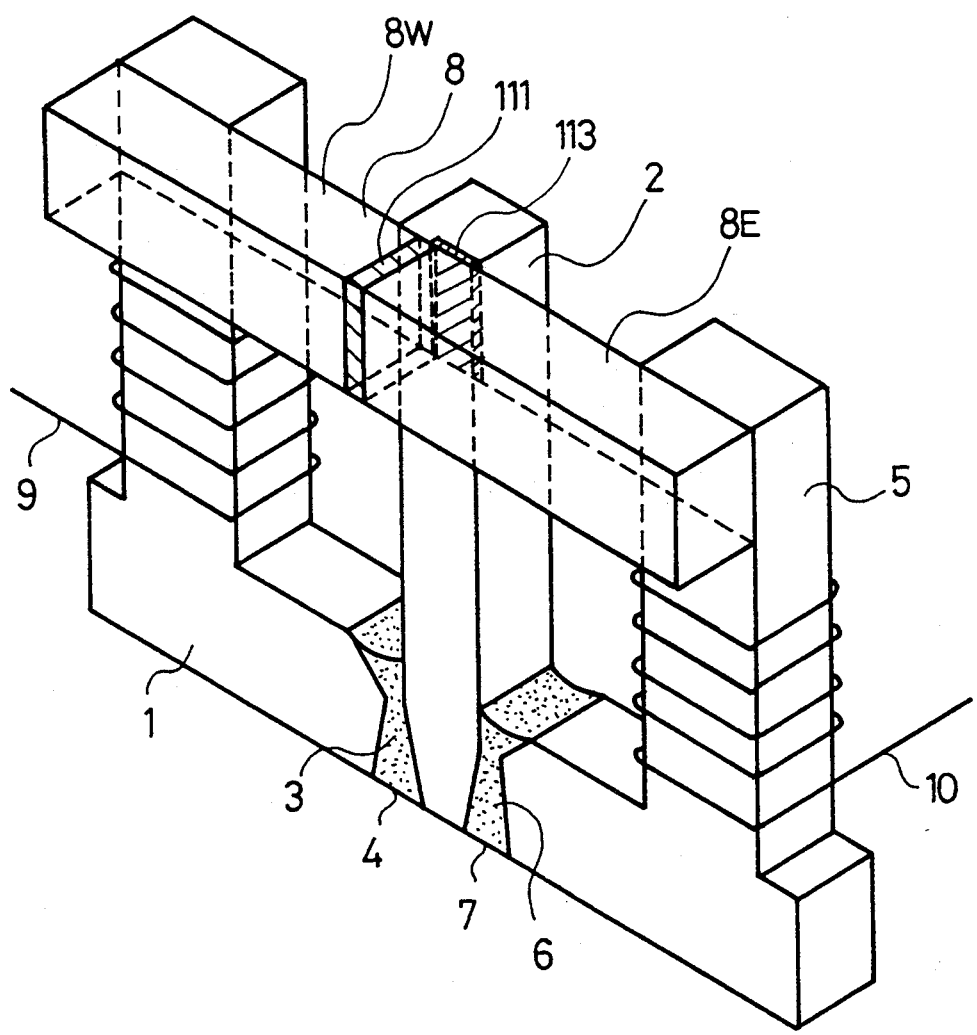

In FIGS. 20 and 21, non-magnetic gaps 113 are provided at the coupling portion between the back core 8 and the erase core 5 and at the coupling portion between the center core 2 and the erase-head side back core 8E separated by the spacer 11, respectively. This arrangement allows increase in the magnetic reluctance of the erase head.

Figure 22:
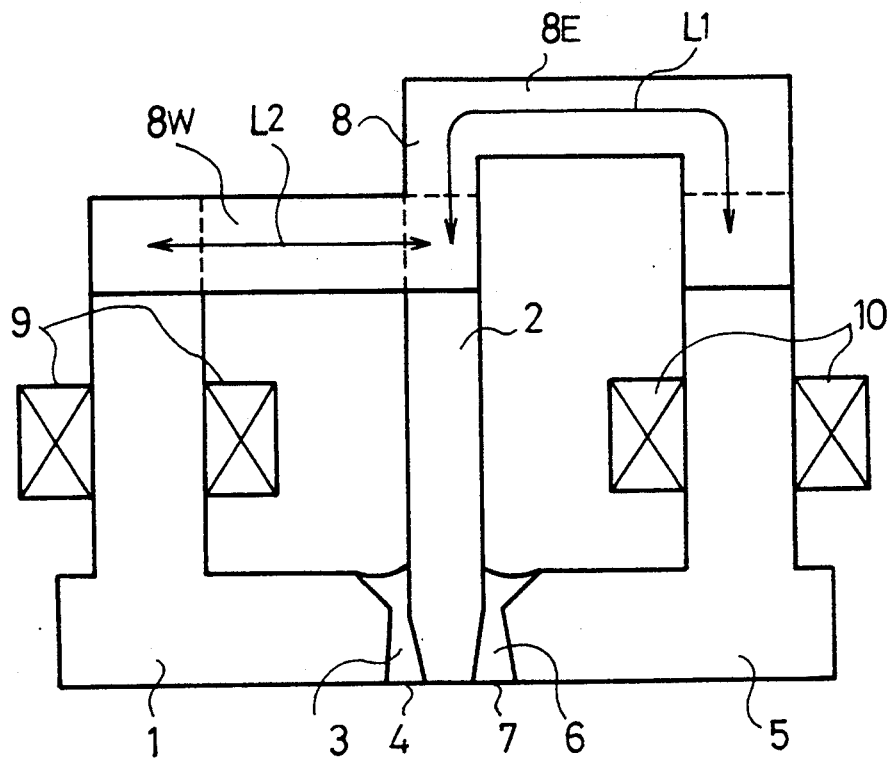
Figure 23:
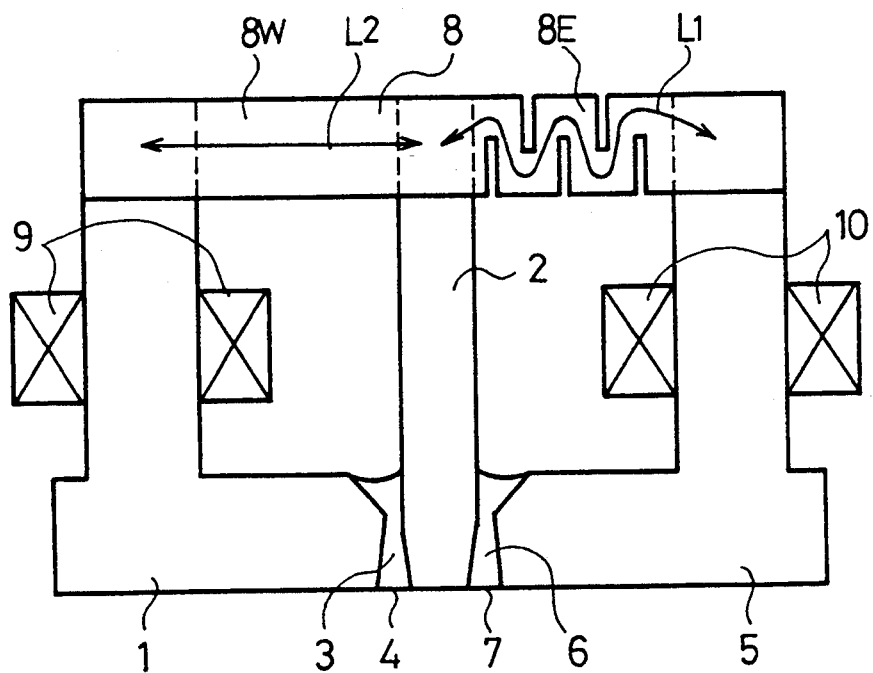

In FIGS. 22 and 23, the magnetic path length L1 of the erase-head side back core 8E is arranged to be longer than the magnetic path length L2 of the read/write-head side back core 8W. This arrangement also allows increase in the magnetic reluctance of the erase head.

Figure 24:
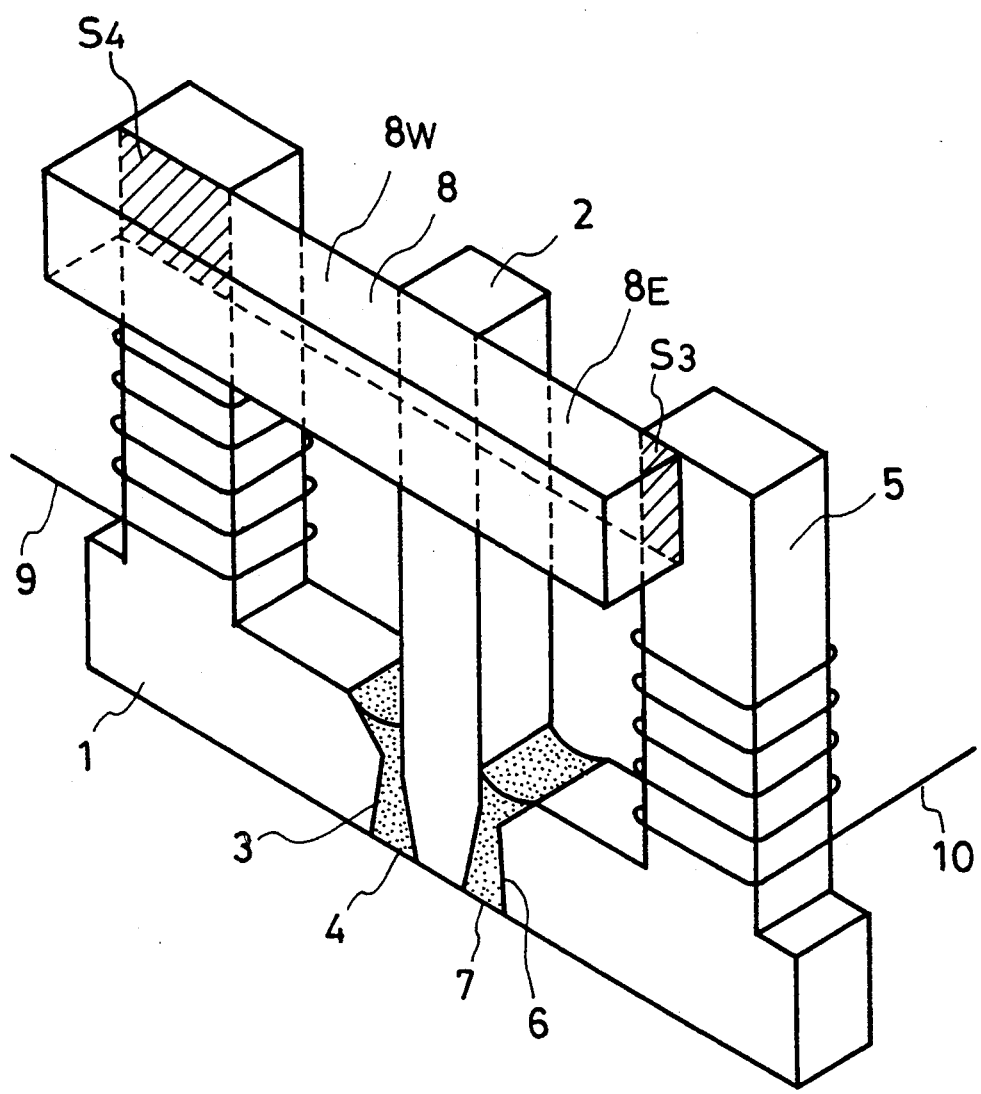
FIGS. 24 and 25 are perspective views showing a magnetic head according to an embodiment of the invention.

In FIG. 24, the contact area S3 of the coupling portion between the back core 8 and the erase core S is arranged to be smaller than the contact area S4 of the coupling portion between the back core 8 and the read/write core 1, thereby increasing the magnetic reluctance of the erase head. Thus, the reproduction efficiency can be reduced and the magnetic flux $\phi E$ to be drawn by the erase gap 7 in reproduction can be reduced so as to reduce the magnetic flux $\phi E3$ to be leaked into the read/write head.

Figure 25:
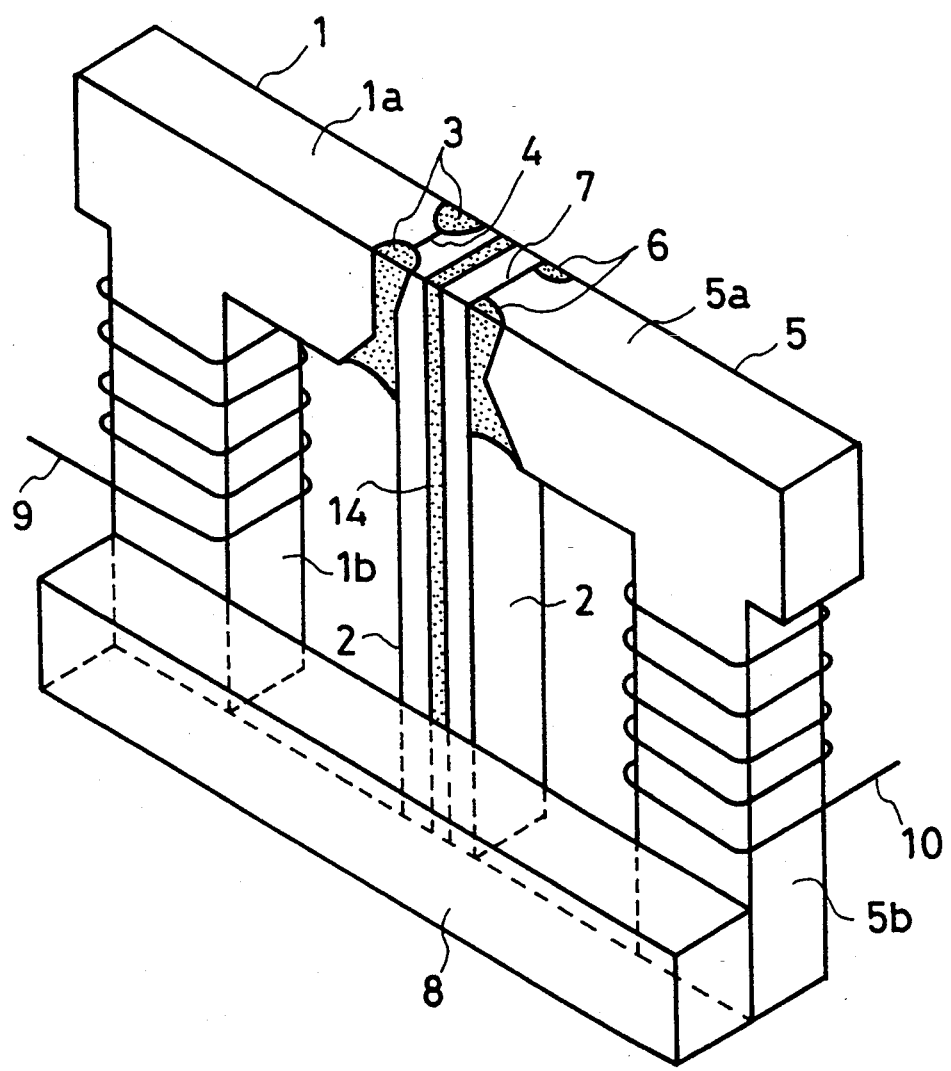

Here, although in the above-described embodiments as illustrated in FIGS. 10, 13 to 24 the description has been made in terms of magnetic heads of the integrated type that the center core 2 is used in common to both the read/write head and erase head, it is appropriate that a magnetic head is constructed as illustrated in FIG. 25 where a non-magnetic spacer 14 such as a glass is provided in the center core 2 for separation between the read/write head and the erase head. This arrangement can provide the same effect as the above-described embodiments.

Figure 26:
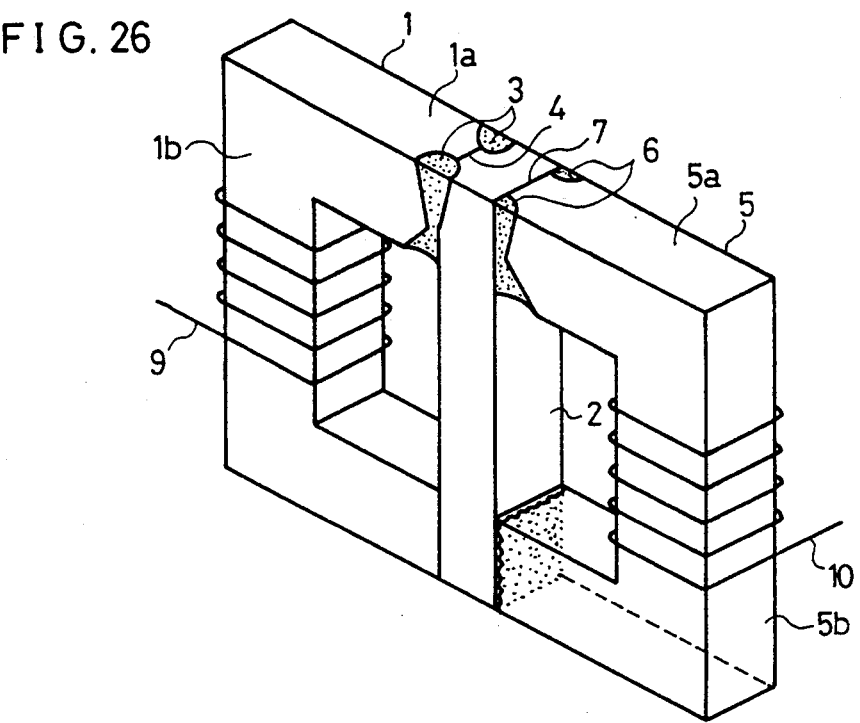
FIG. 26 is a perspective view showing a magnetic head according to an embodiment of the inventions.

Further, it is also appropriate that the magnetic head is constructed as illustrated in FIG. 26, that is, the back core 8 and the erase core 5 are constructionally integrated with each other so as to form a closed magnetic circuit with the erase core 5 and center core 2 without independently providing the back core 8. In this case, a means for more heightening the magnetic reluctance of the erase head side as compared with the magnetic reluctance of the read/write head side is provided at the coupling portion of the erase core and the center core. One example of the means is that as illustrated in FIG. 26 the coupling portion of the erase core to the center core (or the coupling portion of the center core to the erase core) is roughened. With this arrangement, the reproduction efficiency of the erase head can be reduced to thereby prevent the signal reproduced by the erase head from being leaked into the read/write head.

Figure 27:
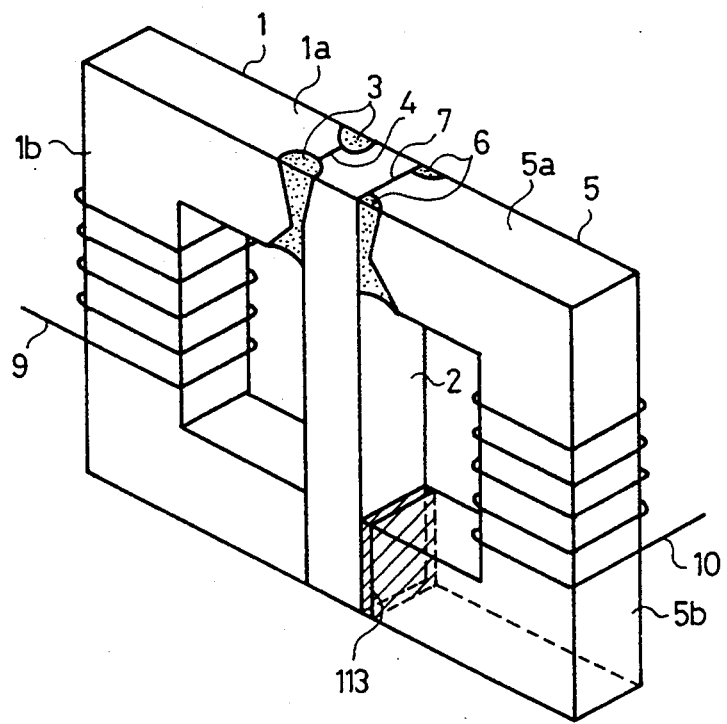
FIG. 27 is a perspective view showing a magnetic head according to an embodiment of the invention.

Further, such a means can be realized by providing a non-magnetic gap 113 at the coupling portion between the erase core 5 and the center core 2 as illustrated in FIG. 27.

Still further, such a means can also be realized with the contact area S5 of the coupling portion of the erase core 5 and the center core 2 being arranged to be smaller than the contact area S6 of the coupling portion of the read/write core 1 and the center core 2 as illustrated in FIG. 28.

According to the embodiments as described above, the magnetic head is provided with the back core coupled to the read/write core, center core and erase core, and the read/write head with a closed magnetic circuit comprising the read/write core, center core and back core is constructionally integrated with the erase head with a closed magnetic circuit comprising the erase core, center core and back core. Since the erase-head side magnetic reluctance of the back core is arranged to be greater the read/write-head side magnetic reluctance thereof, the magnetic flux to be drawn by the erase gap can be reduced so as to prevent the leakage into the read/write head, thereby making possible to obtain a reproduced signal with a high reliability.

As the means to more increase the magnetic reluctance of the erase-head side back core as compared with the magnetic reluctance of the read/write-head side back core, there is a non-magnetic spacer which is provided in the back core for separation between the erase head and the read/write head. This spacer is shifted to the erase head side with respect to the center of the center core.

The cross-sectional area of a portion or all of the erase-head side back core which cross the magnetic path is arranged to be smaller than that cross-sectional area of the read/write-head side back core which also crosses the magnetic path.

The erase core and the center core, the center core and the read/write core are respectively coupled to each other through a plurality of back cores, and the number of the erase-head side back cores is arranged to be smaller than the number of the read/write-head side back cores.

The magnetic head is equipped with two back cores which spacers for separation between the erase head and time read/write head are respectively positioned at the erase-head side and read/write-head side of the center core, and the cross-sectional area of the back core in which the spacer is positioned at the read/write-head side is arranged to be smaller than the cross-sectional area of the back core in which the spacer is positioned at the erase-head side, the cross-sectional areas crossing magnetic path.

A portion or all of the surface of the erase-head side back core is machined to be rougher than the surface of the read/write core.

The coupling portion of the erase core to the back core is more roughened as compared with the coupling portion of the read/write core to the back core.

A non-magnetic gap is provided at the coupling portion between the back core and the erase core or at the coupling portion between the center core and the erase-head side back core of time back core which is separated by means of the spacer into the erase head side and the read/write head side.

The magnetic path length of the erase-head side back core is arranged to be longer than the magnetic path length of the read/write-head side back core.

The contact area of the coupling portion between the back core and the erase core is arranged to be smaller than the contact area of the coupling portion between the back core and the read/write core. Such above-described arrangements are effective for achieving the purposes.

Further, in the magnetic heads according to the invention in which the read/write head constructed with a closed magnetic circuit comprising the center core, and read/write core is constructionally integrated with the erase head constructed with a closed magnetic circuit comprising the center core and erase core without providing the back core to be coupled to the read/write core, center core and erase core, the coupling portion of the erase core and the center core is machined to be rougher than the coupling portion of the read/write core and the center core, or a non-magnetic gap is provided at the coupling portion of the erase core and the center core, or the contact area of the coupling portion between the erase core and the center core is arranged to be smaller than the contact area of the coupling portion between the read/write core and the center core, whereby the reproduction efficiency can similarly be reduced so as to reduce the leakage of the erase head-reproduced signal into the read/write head, thereby providing the effect to obtain a high-performance magnetic head.

Figure 29:
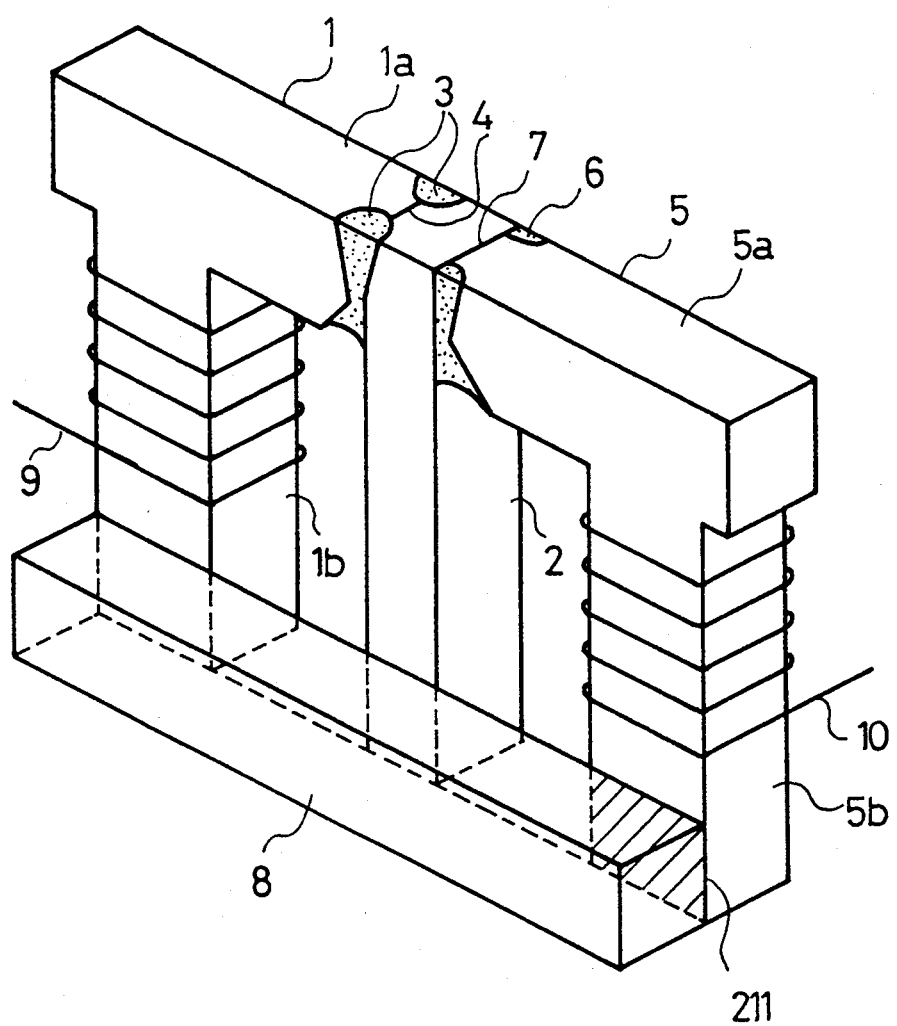
FIG. 29 is a perspective view showing a magnetic head according to an embodiment of the invention.
Figure 30A:
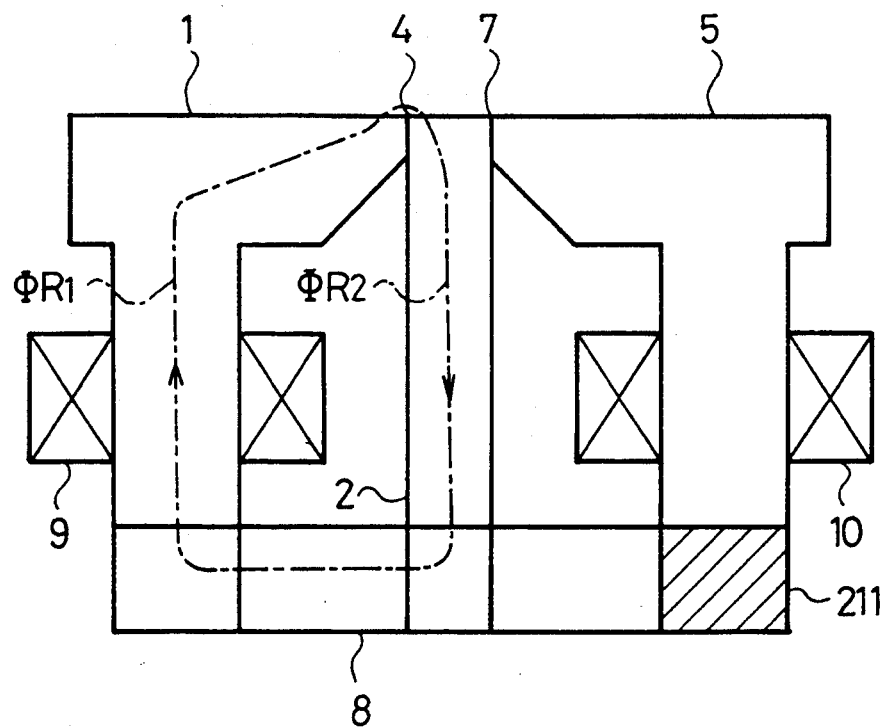
FIG. 30(a) and 39(b) are elevation side view and top plan view schematic diagrams for describing the reproducing process of the magnetic head shown in FIG. 29.
Figure 30B:
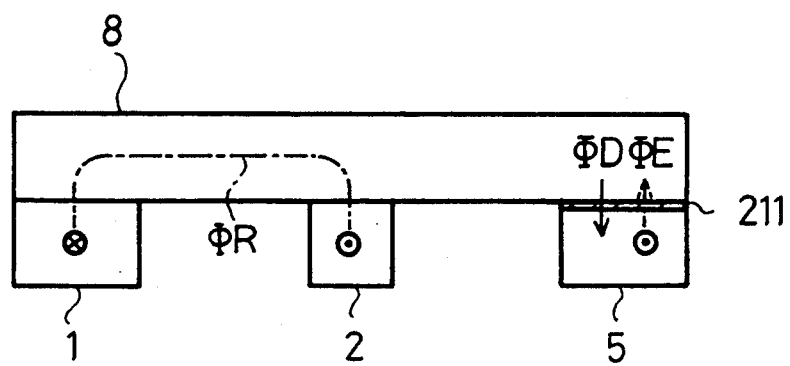

FIG. 29 is a perspective view showing a magnetic head according to an embodiment of the invention. FIGS. 30(a) and 30(b) are schematic illustration for describing the reproducing process of the magnetic head according to this embodiment, where (a) is a front elevation view and (b) is a bottom plan view. In FIGS. 29, 30(a) and 30(b), 1 represents a read/write core made of a magnetic material, 1a designates a medium-sliding surface thereof, 1b indicates a leg portion thereof, 2 depicts a center core made of a magnetic material, 3 denotes a non-magnetic coupling material, 4 is a read/write gap, 5 represents an erase core made of a magnetic material, 5a designates a medium-sliding surface thereof, 5b depicts a leg portion thereof, 6 is a non-magnetic coupling material, 7 is an erase gap, 8 represents a back core made of a magnetic material, 9 designates a read/write coil, and 10 denotes an erase coil. These parts correspond to those of the conventional magnetic head illustrated in FIG. 48. Numeral 211 is a spacer provided at the coupling portion of the erase core 5 and the back core 7, the spacer being made of an electrically conductive magnetic material (which will be referred hereinafter to as a conductive material) such as a perm-alloy (NiFe). This spacer 211 is formed by sputtering a conductive material on the core coupling surfaces, interposing a thin-plate member or using an adhesive including a conductive material.

Operation will be described hereinbelow. Since in this embodiment the spacer 211 made of a conductive material is provided in a closed magnetic circuit of the erase head, i.e., on the coupling surface of the erase core 5 and the back core 8, even if a slight leakage magnetic flux $\phi E$ on the medium is drawn by the erase gap 7 in reproduction, since the magnetic flux is a high frequency magnetic flux obtained by reproducing the data signal, a magnetic flux $\phi D$ is generated in the direction to block the magnetic flux $\phi E$ due to an eddy current produced passing through the conductive spacer 211, so as to cancel the drawn magnetic flux, thereby preventing the leakage to the read/write core 1 side as shown in FIG. 30(a) and 30(b).

Here, in the erasing operation, the eddy current is not generated because the erasing magnetic flux generated by the erase coil 10 is a direct-current magnetic flux, and therefore the erasing operation due to the erase head can be effected as well as in the conventional magnetic head.

Figure 31:
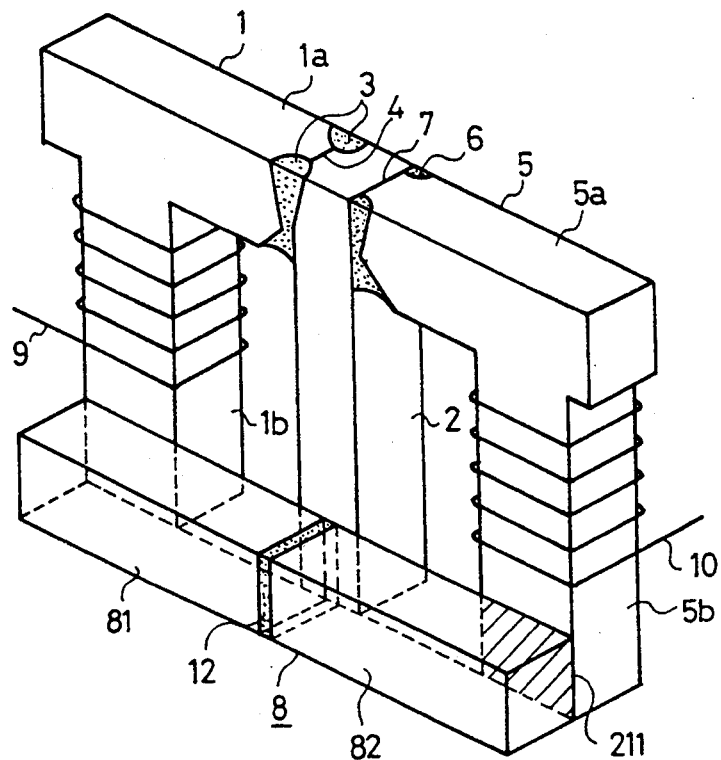
FIGS. 31 to 34 are perspective views showing a magnetic head according to a further embodiment.
Figure 32:
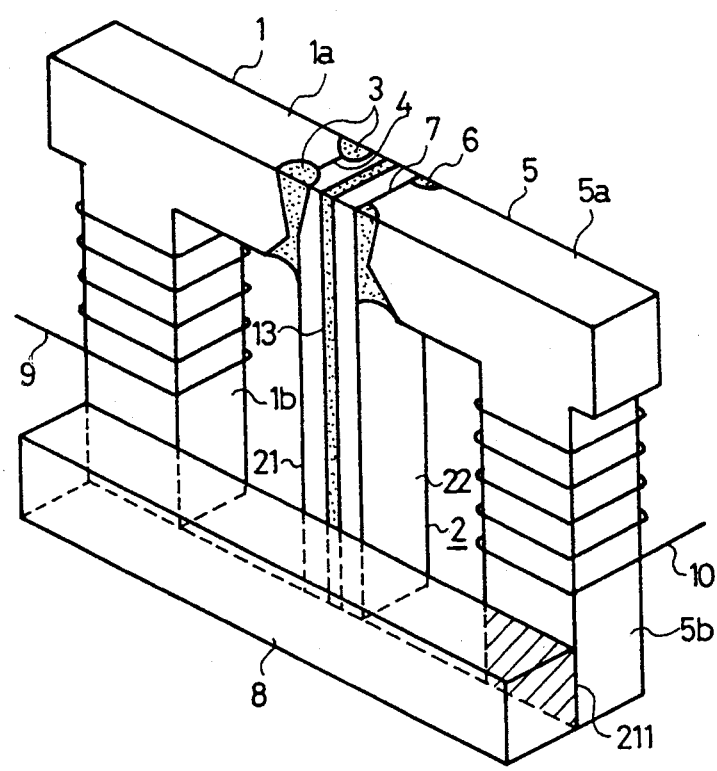
Figure 33:
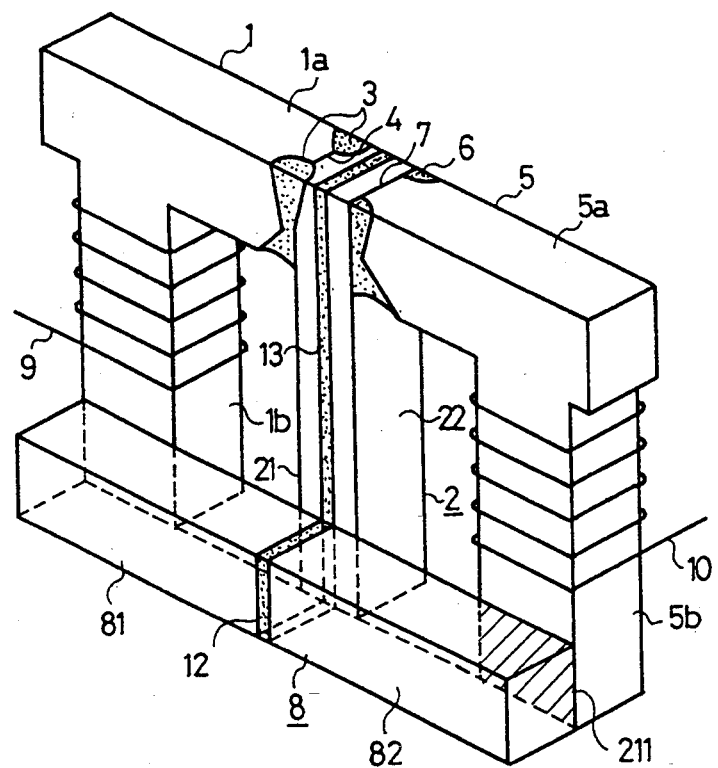
Figure 34:
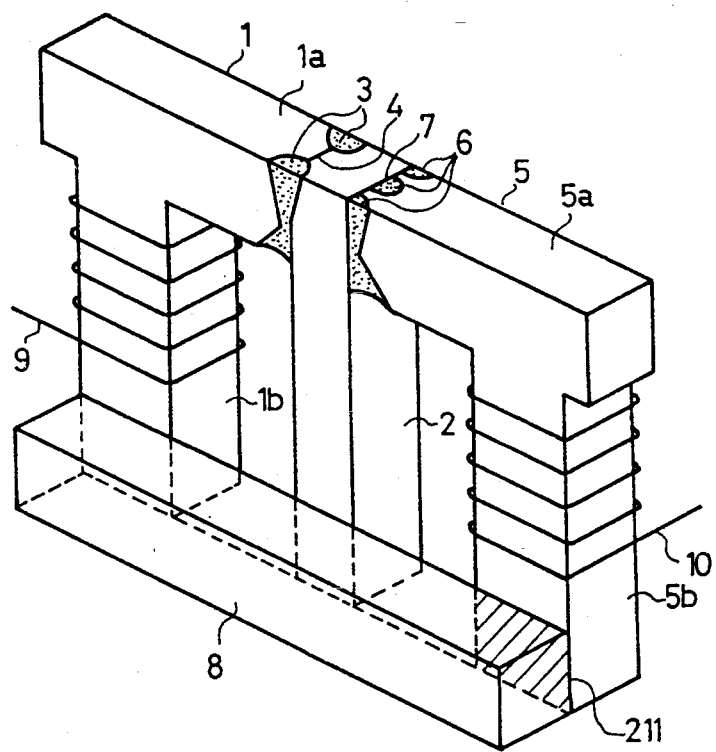

FIGS. 31 to 34 are perspective views showing further embodiments of the invention. FIG. 31 illustrates the embodiment in which a non-magnetic spacer 12 such as a glass is provided in the back core 8 so as to magnetically separate it into a magnetic material section 81 forming a closed magnetic circuit of the read/write magnetic flux arid a magnetic material section 82 for forming a closed magnetic circuit of the erase magnetic flux. FIG. 32 illustrates the embodiment in which a non-magnetic spacer 13 such as a glass is provided in the center core 2 so as to magnetically separate it into a magnetic material section 21 for forming a closed magnetic circuit of the read/write magnetic flux and a magnetic material section 22 for forming a closed magnetic circuit of the erase magnetic flux. FIG. 33 illustrates the embodiment in which the center core 2 and the back core 8 are respectively divided by non-magnetic spacers 12 and 13 so as to form magnetic material sections 21, 81 for forming a closed magnetic circuit of the read/write magnetic flux and further to form magnetic material sections 22, 82 for forming a closed magnetic circuit of the erase magnetic flux. FIG. 34 illustrates the embodiment in which the erase gap 7 is not constructed as the advance erasing type gap but is constructed as a tunnel erasing type gap. These embodiments have the same effects as the embodiment illustrated in FIG. 29.

Figure 35:
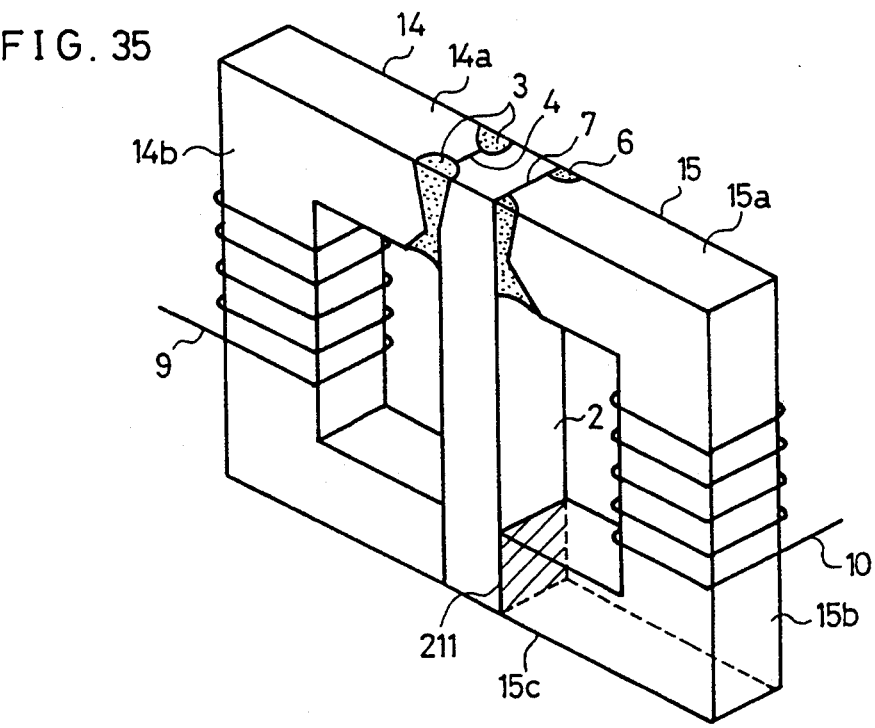
FIG. 35 is a perspective view showing a magnetic head according to an embodiment of the invention.
Figure 36:
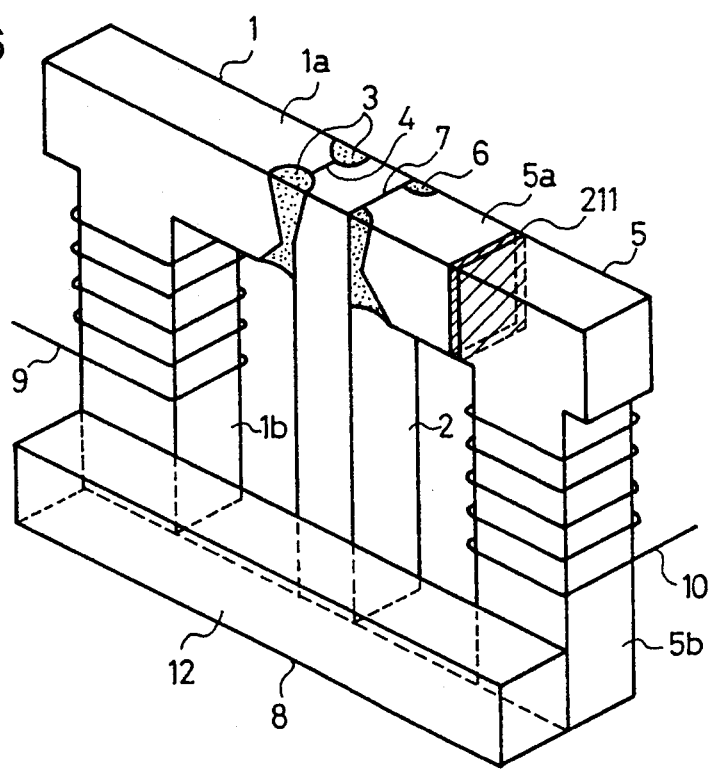
FIG. 36 is a perspective view showing a magnetic head according to an embodiment of the invention.
Figure 37:
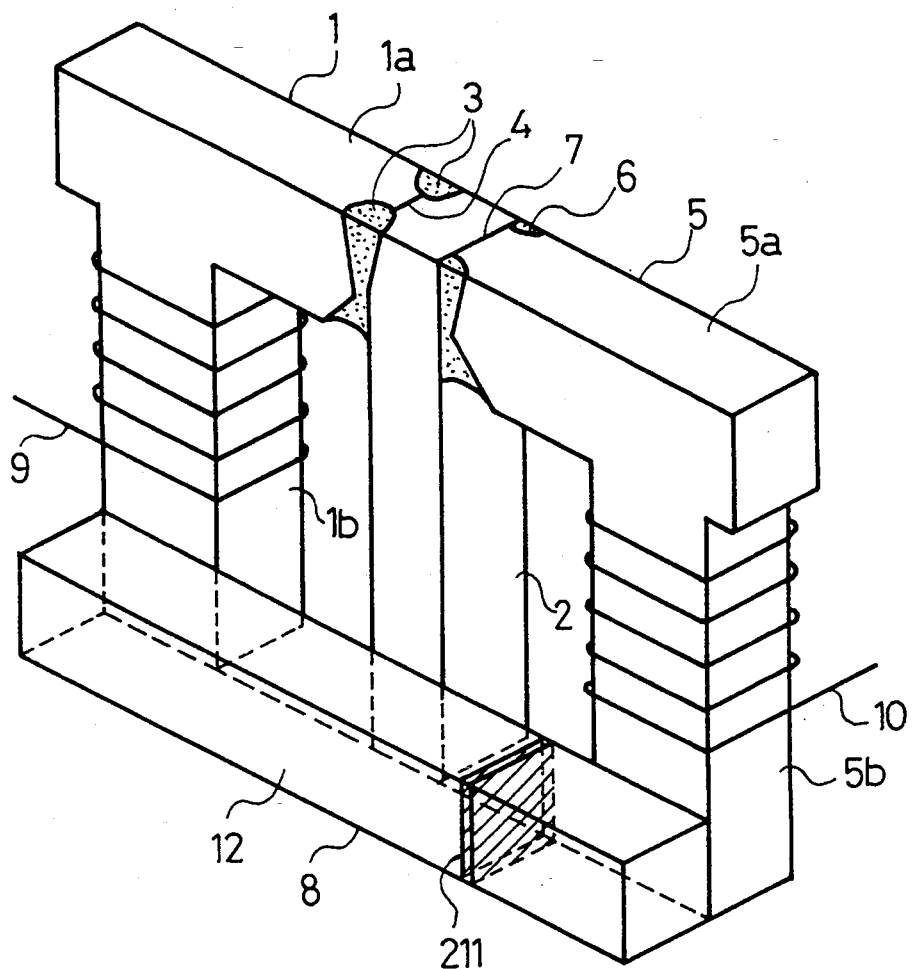
FIG. 37 is a perspective view showing a magnetic head according to an embodiment of the invention.

FIGS. 35 to 37 are perspective views showing embodiments of the invention. FIG. 35 shows an embodiment of the invention in which a read/write core 14 and an erase core 15 are not constructed to have a T-shaped configuration as described but constructed to have E-shaped configuration so as to omit the back core 8, where a spacer made of a conductive material is provided at the coupling portion of a leg portion 15c of the erase core 15 and the center core 2. FIG. 36 shows an embodiment of the invention in which a spacer 211 made of a conductive material is provided in the erase core 5 so as to cross the passing magnetic flux. FIG. 37 shows an embodiment of the invention in which a spacer 211 made of a conductive material is provided between the coupling portion of the back core 8 to the erase core 5 and the coupling portion thereof to the center core 2 so as to cross the passing magnetic flux. These embodiments has the same effects as the above-described embodiments.

According to the embodiments described above, the spacers made of a conductive material and crossing the passing magnetic path are provided at the coupling surface of the erase core and the back core, the coupling surface of the erase E-shaped core and the center core, in the erase core, or in the erase head closed magnetic circuit such as a portion between the coupling surface of the back core to the erase core and the coupling surface thereof to the center core. Accordingly, the magnetic flux to be drawn by the erase gap and to be leaked into the read/write head can be reduced, thereby providing magnetic heads having a high reliability and not having the possibility of the error generation and margin lowering so as to reproduce a signal with less noise.

Figure 38:
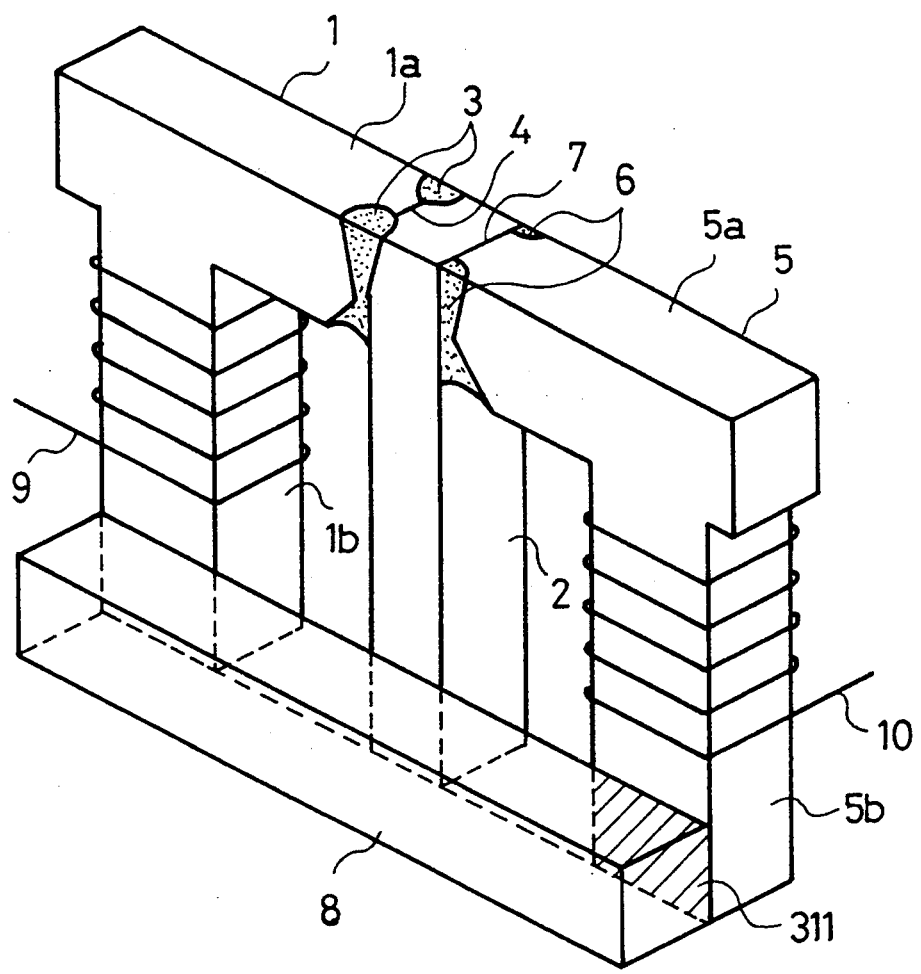
FIG. 38 is a perspective view for indication of a magnetic head according to an embodiment of the present invention.
Figure 39A:
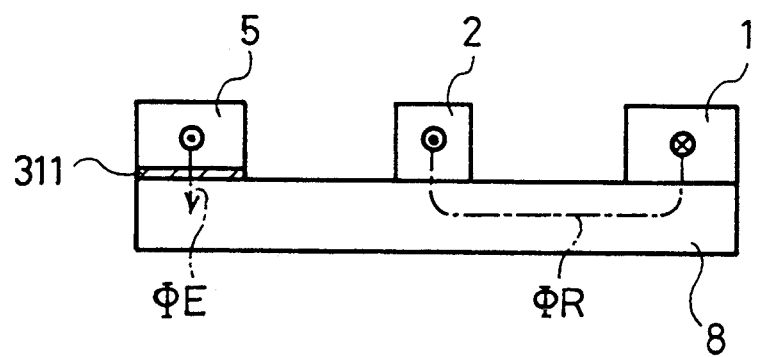
Figure 49A:
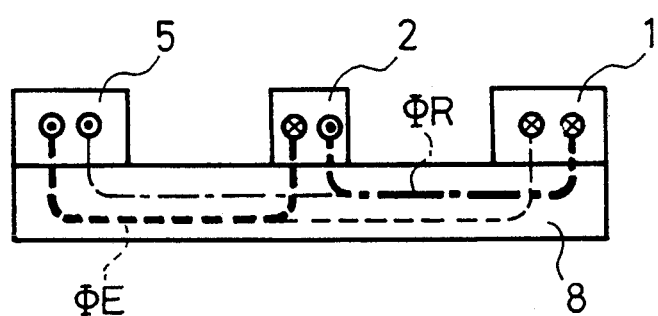
Figure 49B:
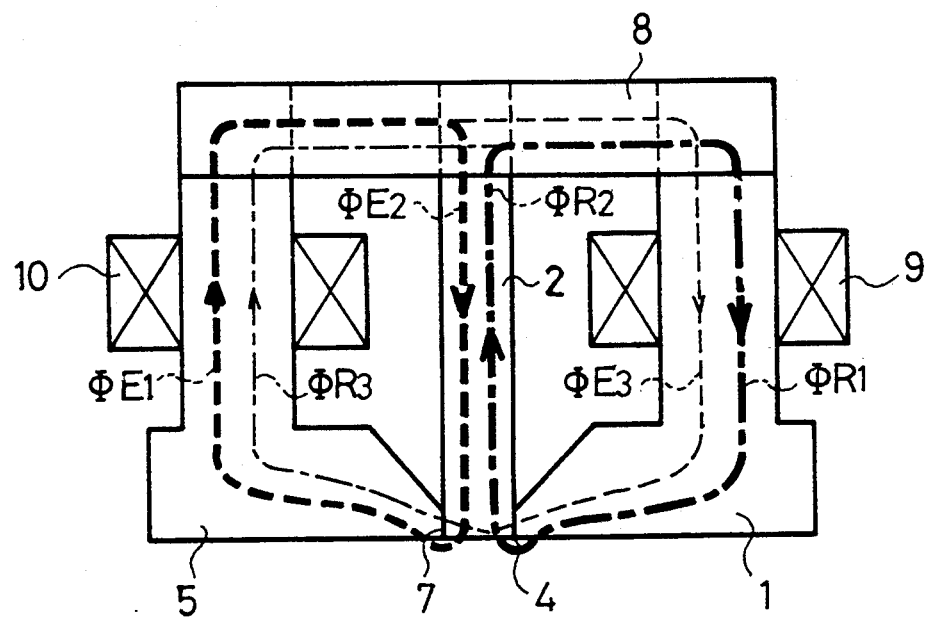

FIG. 38 is a perspective view of a magnetic head according to an embodiment of the invention, and FIGS. 39(a) and (b) are illustrations for describing the flow of the magnetic flux in the reproducing process of the magnetic head of this invention, where parts corresponding to those in FIGS. 48, 49(a) and 49(b) are marked with the same numbers and characters and the description thereof will be omitted.

Figure 39B:
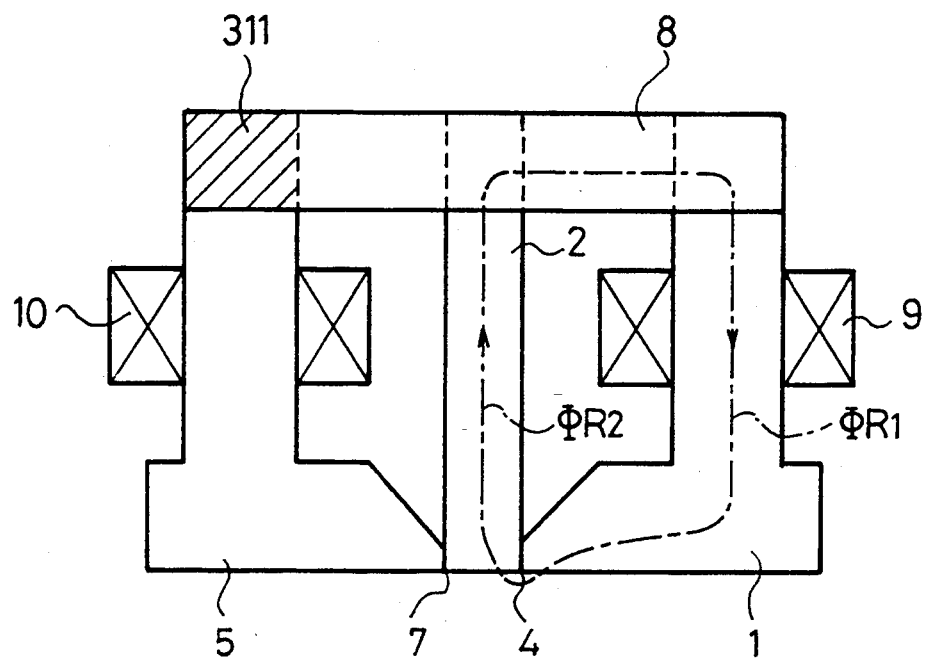

In FIGS. 38, 39(a) and 39(b), numeral 311 is a spacer provided at the coupling portion of the erase-head side erase core 5 and the back core 8 and made of a magnetic material such as a Mn—Zn ferrite having a lower magnetic permeability as compared with that of the cores, i.e., having a magnetic permeability lower by about one figure than that of the cores, or made of a non-magnetic material such as a glass. Here, for example, in the case of forming the spacer 311, the spattering is made at the coupling portion between the erase core 5 and the back core 8, a thin-plate-like member is interposed therebetween, or an adequate member is added to an adhesive which is in turn used therefor.

Secondly, a description will be made hereinbelow in terms of the operation of the magnetic head according to the embodiment of this invention. In the magnetic head according to this invention, as illustrated in FIG. 38, the spacer 311 made of a magnetic material having a lower permeability than that of the erase core 5, center core 2 arid back core 8 or made of a non-magnetic material is provided in the closed magnetic circuit of the erase head comprising the erase core 5, center core 2 and back core 8, particularly at the coupling portion of the erase core 5 and the back core 8, and therefore the magnetic reluctance of the closed magnetic circuit of the erase head becomes high so as to lower the reproduction efficiency at the erase gap 7. Thus, the magnetic flux $\phi E1$ passing through the erase core 5 is reduced and hence the magnetic flux $\phi E3$ to be leaked to the read/write head side can be reduced.

Here, in the erasing operation due to the erase head, the erase current is increased, thereby providing the same erasing effect as the convention magnetic head.

FIGS. 40 to 47 are perspective views showing the arrangements of magnetic heads according to further embodiments of this invention where parts corresponding to those in FIG. 38 are marked with the same numerals and characters and the detailed description thereof will be omitted.

Figure 40:
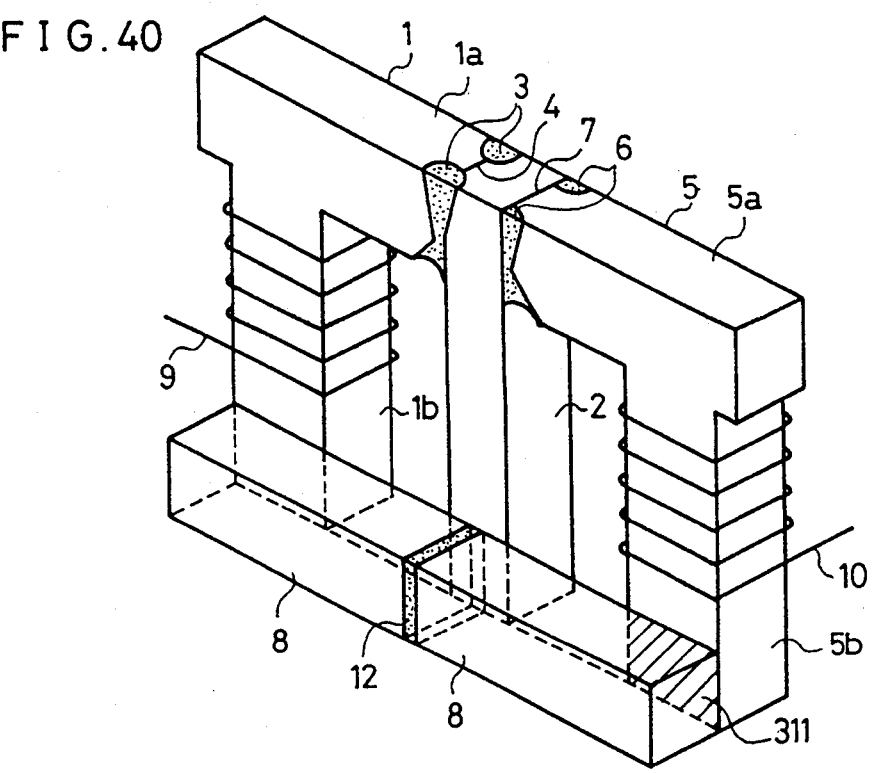
FIGS. 40 to 47 are perspective views showing a magnetic head according to a further embodiment of the invention.
Figure 41:
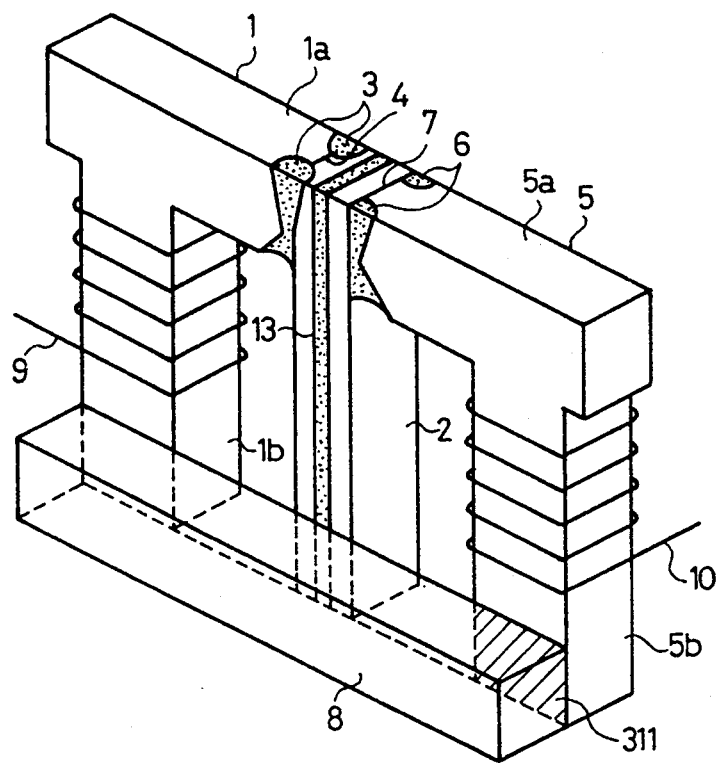
Figure 42:
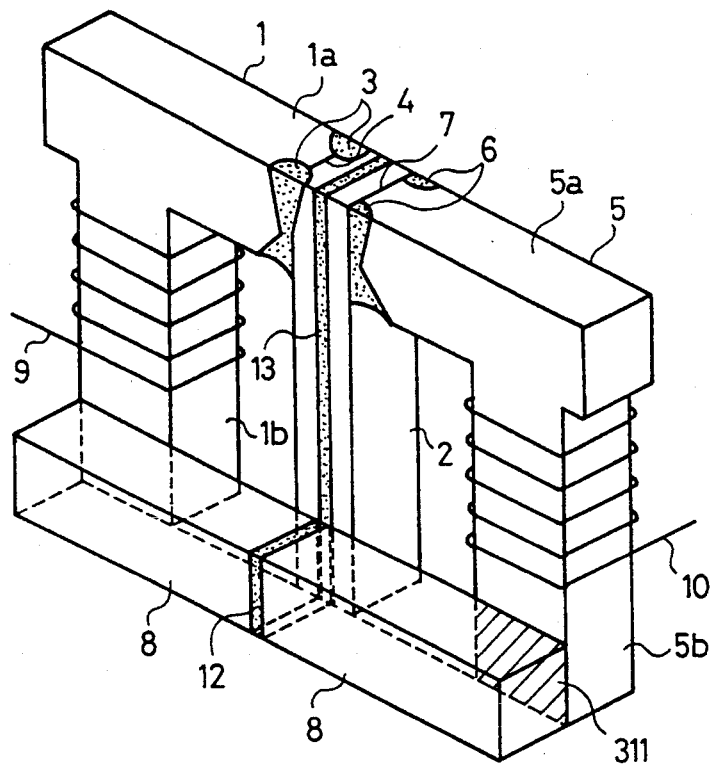

In the magnetic head of the embodiment shown in FIG. 38, the erase head and read/write head comprising the read/write core 1, center core 2, erase core 5 and back core 8 are constructionally integrated each other, and on the other hand, according to the embodiment illustrated in FIG. 40 is provided a magnetic head which is of the separation type that a spacer 12 made of a non-magnetic material such as a glass is provided at a substantial central portion of the back core 8. Further, according to the embodiment illustrated in FIG. 41 is provided a magnetic head which is of the separation type that a center spacer 13 made of a non-magnetic material such as a glass is provided at a substantial central portion of the center core 2 in order for separation between the read/write head and the erase head. Still further, according to the embodiment shown in FIG. 42 is provided a magnetic head which is the separation type and which is equipped with the spacer 12 in FIG. 40 and the spacer 13 in FIG. 41.

Figure 43:
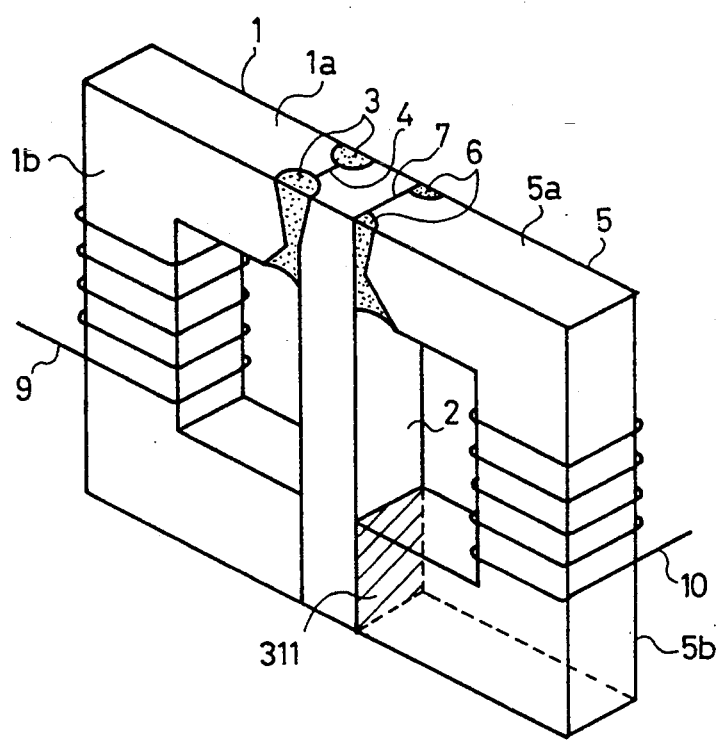

In addition, according to the embodiment shown in FIG. 43 is provided a magnetic head in which the back core to be coupled to the read/write core 1, center core 2 and erase core 5 is not disposed but the closed magnetic circuit of the read/write head is formed with the read/write core 1 and the center core 2 and the closed magnetic circuit of the erase head is formed with the erase core 5 and the center core 2. In this magnetic head, a spacer 311 made of a magnetic material having a lower magnetic permeability than that of the cores illustrated in FIG. 1 or made of a non-magnetic material is provided at the coupling portion of the erase core 5 and the center core 2.

Figure 44:
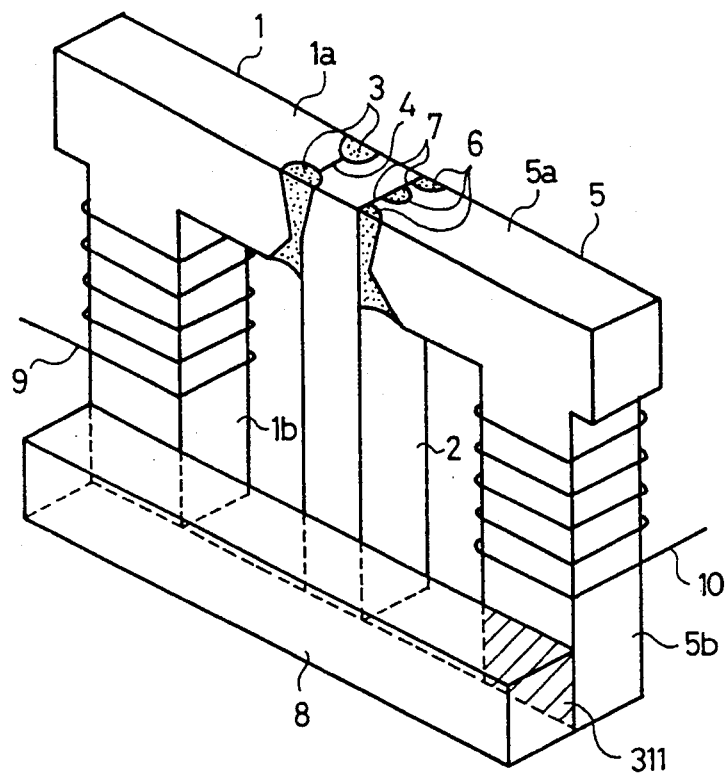

Further, although in the magnetic heads of the above-described embodiments the erase gap 7 of the erase head is of the advance erasing type, according to the embodiment of FIG. 44 there is provided a magnetic head in which the erase gap 7 is of the tunnel type.

Figure 45:
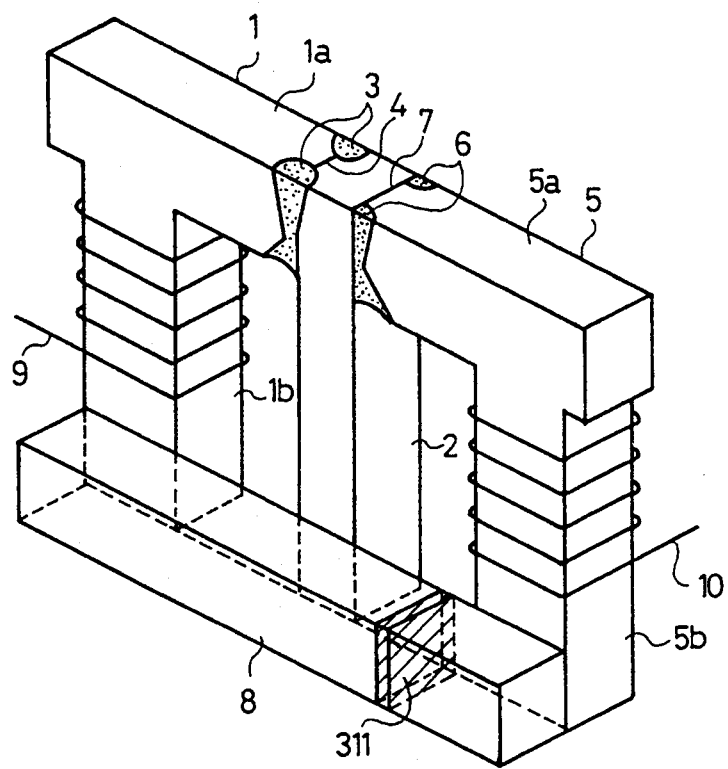
Figure 46:
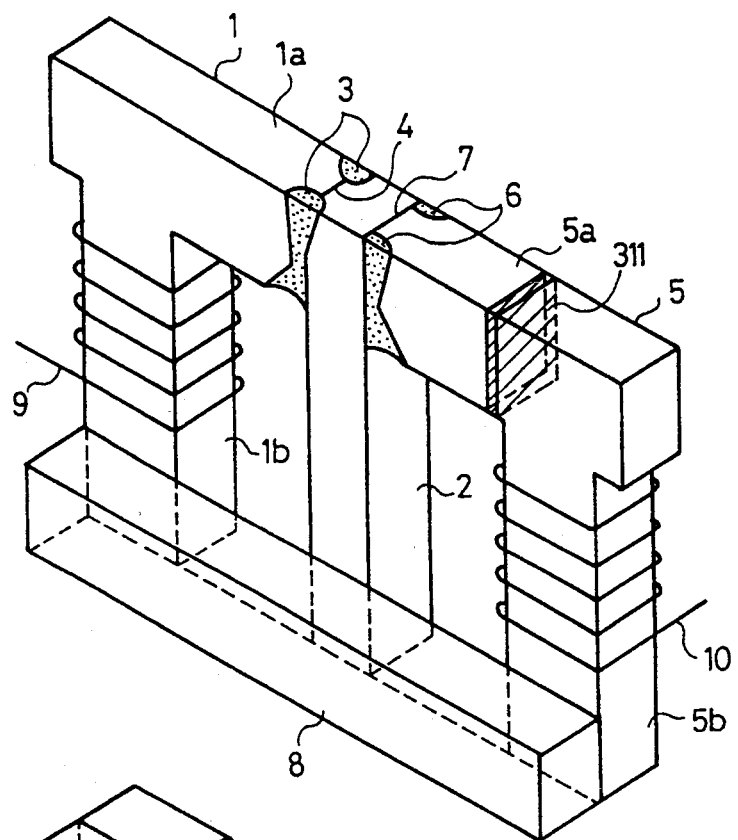

Still further, although in the magnetic heads according to the above-described embodiments the spacer 311 made of a magnetic material having a lower magnetic permeability than the cores or made of a non-magnetic material is provided at the coupling portion of the erase core 5 and the back core 8 or the coupling portion of the erase core 5 and the center core 2, according to the embodiment shown in FIG. 45 there is provided a magnetic head in which a spacer 311 is provided in the back core 8 itself, and according to the embodiment shown in FIG. 46 there is provided a magnetic head in which a spacer 311 is provided in the erase core 5 itself.

Figure 47:
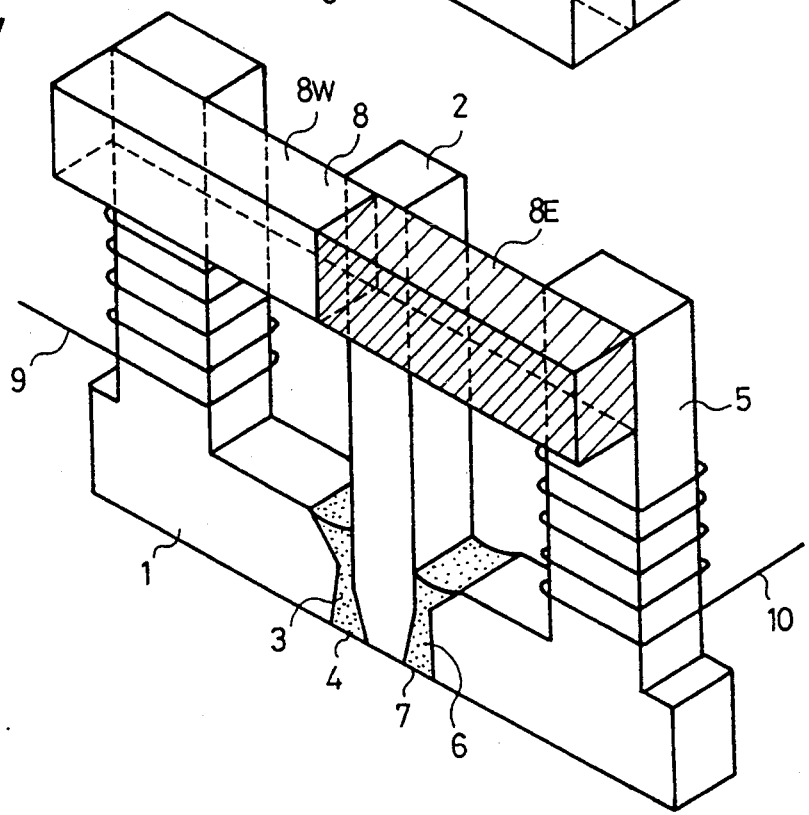

Moreover, although the spacer 311 made of a magnetic material having a lower magnetic permeability than the cores or made of a non-magnetic material is provided in the erase-head side closed magnetic circuit in order to more increase the magnetic reluctance of the erase-head side closed magnetic circuit as compared with the magnetic reluctance of the read/write-head side closed magnetic circuit, according to the embodiment of FIG. 47 there is provided a magnetic head in which the spacer 311 is not provided but the back core 8 is composed of a read/write-head side back core 8W and an erase-head side back core 8E and further the erase-head side back core 8E is made of a magnetic material having a lower magnetic permeability than that of the read/write-head side back core 8W. This arrangement can provide the same action as the spacer.

The magnetic heads of the respective embodiments illustrated in FIGS. 40 to 47 have the same effect as the magnetic head of the embodiment illustrated in FIG. 38.

Here, the magnetic permeability of the magnetic material used as the spacer is sufficient to be deter,lined so as to more increase the magnetic reluctance of the erase-head side closed magnetic circuit as compared with the magnetic reluctance of the read/write-head side closed magnetic circuit to reduce the magnetic flux to be drawn by the erase gap. Thus, the sufficient effect can be obtained when lowering the magnetic permeability thereof by about one figure as compared with the magnetic permeability of the cores.

According to the embodiments described above, in the magnetic heads having an integral construction of the read/write head and the erase head, a spacer made of a non-magnetic material or made of a magnetic material having a magnetic-permeability lower than that of the cores of the head is provided in the closed magnetic circuit of the erase head so as to cross the passing magnetic path. Therefore, the magnetic flux to be drawn by the erase gap can be reduced to prevent this magnetic flux from being leaked to the read/write head side, thereby providing a magnetic head with high reliability and high performance.

According to the invention, since the magnetic reluctance of the closed magnetic circuit of the erase head is arranged to be greater than the magnetic reluctance of the closed magnetic circuit of the read/write head, the leakage of the signal reproduced by the erase head into the read/write head can be reduced, thereby providing a magnetic head which is capable of preventing the error generation and margin lowering.

According to the invention, since the erase core is made of a magnetic material having a lower high-frequency magnetic permeability as compared with the read/write core or made of an electrically conductive magnetic material, the magnetic flux to be drawn by the erase gap and leaked into the read/write head can be attenuated so as to produce a signal with less noise, thereby providing a magnetic head with high performance and high reliability which is capable of preventing the error generation and margin lowering.

According to the invention, since the magnetic material section of the center core to be, coupled to the erase core is made of a magnetic material having a lower high-frequency magnetic permeability than that of the read/write core or made of an electrically conductive magnetic material, the magnetic flux to be drawn by the erase gap and leaked into the read/write head can be attenuated so as to reproduce a signal with less noise, thereby providing a magnetic head with high performance and high reliability which is capable of preventing the error generation and margin lowering.

According to the invention, since the magnetic material section of the back core to be coupled to the erase core is made of a magnetic material having a lower high-frequency magnetic permeability as compared with that of the read/write core or made of an electrically conductive magnetic material, the magnetic flux to be drawn by the erase gap and leaked into the read/write head can be attenuated to produce a signal with less noise, thereby providing a magnetic head with high performance and high reliability which is capable of preventing the error generation and margin lowering.

According to the invention, since the magnetic reluctance of the erase-head side of the back core is arranged to be greater than the magnetic reluctance of the read/write-head side thereof, the magnetic flux to be drawn by the erase gap can be reduced to prevent the leakage the read/write head, thereby obtaining a reproduced signal with high performance and high reliability.

According to the invention, since the coupling portion of the erase core and the center core is machined to be rougher than the coupling portion of the read/write core and the center core, the reproduction efficiency of the erase head can be lowered so that the leakage of the signal reproduced by the erase head into the read/write head is reduced, thereby providing a magnetic head with high performance and high reliability.

According to the invention, since a non-magnetic gap is formed at the coupling portion of the erase core and the center core so as to lower the reproduction efficiency of the erase head, the leakage of the signal reproduced by the erase head into the read/write head can be reduced, thereby providing a magnetic head with high performance and high reliability.

According to the invention, since the contact area of the coupling portion between the erase core and the center core is arranged to be smaller as compared with the contact area of the coupling portion between the read/write core and the center core, the reproduction efficiency of the erase head can be reduced and hence the leakage of the signal reproduced by the erase head into the read/write head can be reduced, thereby providing a magnetic head with high performance and high reliability.

According to the invention, since the a spacer made of of an electrically conductive material is provided at the coupling portion of the erase core and the center core, e magnetic flux to be drawn by the erase gap and leaked into the read/write head can be reduced so as to allow reproduction of a signal with less noise, thereby providing a magnetic head with high performance and high reliability which is capable of preventing the error generation and margin lowering.

According to the invention, since the spacer made of an electrically conductive material is provided at the coupling portion between the erase core and the center core, the magnetic flux to be drawn by the erase gap and leaked into the read/write head can be attenuated so as to allow reproduction of a signal with less noise, thereby providing a magnetic head with high performance and high reliability which is capable of preventing the error generation and margin lowering.

According to the invention, since the spacer made an electrically conductive material is provided in the erase core so as to cross the passing magnetic flux, the magnetic flux to be drawn by the erase gap and leaked into the read/write head can be attenuated so as to allow reproduction of a signal with less noise, thereby providing a magnetic head with high performance and high reliability which is capable of preventing the error generation and margin lowering.

According to the invention, since the spacer made of an electrically conductive material is provided between the coupling surface of the back core to the erase core and the coupling surface thereof to the center core so as to cross the passing magnetic path, the magnetic flux to be drawn by the erase gap and leaked into the read/write head can be attenuated so as to allows reproduction of a signal with less noise, thereby providing a magnetic head with high performance and high reliability which is capable of preventing the error generation and margin lowering.

According to the invention, since the spacer made of a non-magnetic material or made of a magnetic material having a lower magnetic permeability than that of the head cores is provided in the closed magnetic circuit of the erase head so as to cross the passing magnetic path, the magnetic flux to be drawn by the erase gap can be reduced so as to preventing the crosstalk phenomenon that the magnetic flux is leaked to the read/write head side, thereby providing a magnetic head with high performance and high reliability.

What is claimed is:

1. A magnetic head comprising a read/write core, a center core coupled to said read/write core to form a read/write gap therebetween on a medium-sliding surface, an erase core coupled to said center core to form an erase gap therebetween on said medium-sliding surface, and a back core coupled to said read/write core, said center core and said erase core, said read/write core, said center core and a first portion of said back core comprising a closed magnetic circuit forming a read/write head, and said erase core, said center core and a second portion of said back core, comprising a closed magnetic circuit forming an erase head integrally constructed with said read/write head, wherein said second portion of said back core has a smaller cross-sectional area than said first portion of said back core.

2. A magnetic head comprising a read/write core, a center core coupled to said read/write core to form a read/write gap therebetween on a medium-sliding surface, an erase core coupled to said center core to form an erase gap therebetween on said medium-sliding surface, and a back core coupled to said read/write core, said center core and said erase core, said read/write core, said center core and a first portion of said back core comprising a closed magnetic circuit forming a read/write head, and said erase core, said center core and a second portion of said back core, comprising a closed magnetic circuit forming an erase head integrally constructed with said read/write head, wherein said erase core is coupled to said center core by a plurality of back cores, said center core is coupled to said read/write core by a plurality of said back cores wherein the number of back cores coupling said erase core to said center core is less than the number of said back cores coupling said center core to said read/write core.

3. A magnetic head comprising a read/write core, a center core coupled to said read/write core to form a read/write gap therebetween on a medium-sliding surface, an erase core coupled to said center core to form an erase gap therebetween on said medium-sliding surface, and a back core coupled to said read/write core, said center core and said erase core, said read/write core, said center core and a first portion of said back core comprising a closed magnetic circuit forming a read/write head, and said erase core, said center core and a second portion of said back core, comprising a closed magnetic circuit forming an erase head integrally constructed with said read/write head, wherein said back core comprises a first back core having a first spacer for separating said erase head and said read/write head, said first spacer being positioned adjacent said center core and on the erase-head side of the center core and a second back core having a second spacer for separating said erase head and said read/write head, said second spacer being positioned adjacent said center core and on the read/write head side of the center core, said second back core having a smaller cross-sectional area than said first back core.

4. A magnetic head comprising a read/write core, a center core coupled to said read/write core to form a read/write gap therebetween on a medium-sliding surface, an erase core coupled to said center core to form an erase gap therebetween on said medium-sliding surface, and a back core coupled to said read/write core, said center core and said erase core, said read/write core, said center core and a first portion of said back core comprising a closed magnetic circuit forming a read/write head, and said erase core, said center core and a second portion of said back core, comprising a closed magnetic circuit forming an erase head integrally constructed with said read/write head, wherein at least a portion of said second portion of said back core is rougher than said first portion of said back core so that a magnetic reluctance of said erase head is greater than a magnetic reluctance of said read/write head.

5. A magnetic head comprising a read/write core, a center core coupled to said read/write core to form a read/write gap therebetween on a medium-sliding surface, an erase core coupled to said center core to form an erase gap therebetween on said medium-sliding surface, and a back core coupled to said read/write core, said center core and said erase core, said read/write core, said center core and a first portion of said back core comprising a closed magnetic circuit forming a read/write head, and said erase core, said center core and a second portion of said back core, comprising a closed magnetic circuit forming an erase head integrally constructed with said read/write head, wherein the portion of said erase core which is coupled to said back core is rougher than the portion of said read/write core which is coupled to said back core.

6. A magnetic head comprising a read/write core, a center core coupled to said read/write core to form a read/write gap therebetween on a medium-sliding surface, an erase core coupled to said center core to form an erase gap therebetween on said medium-sliding surface, and a back core coupled to said read/write core, said center core and said erase core, said read/write core, said center core and a first portion of said back core comprising a closed magnetic circuit forming a read/write head, and said erase core, said center core and a second portion of said back core, comprising a closed magnetic circuit forming an erase head integrally constructed with said read/write head, wherein the second portion of said back core is longer than the first portion of said back core so that the magnetic path of the erase head is longer then the magnetic path of the read/write head.

7. A magnetic head comprising a read/write core, a center core coupled to said read/write core to form a read/write gap therebetween on a medium-sliding surface, an erase core coupled to said center core to form an erase gap therebetween on said medium-sliding surface, and a back core coupled to said read/write core, said center core and said erase core, said read/write core, said center core and a first portion of said back core comprising a closed magnetic circuit forming a read/write head, and said erase core, said center core and a second portion of said back core, comprising a closed magnetic circuit forming an erase head integrally constructed with said read/write head, wherein the portion of said back core which is coupled to said erase core is smaller than the portion of said back core which is coupled to said read/write core.

8. A magnetic head comprising a center core, a read/write core having a first end portion coupled to said center core and a second end portion coupled to said center core through a read/write gap formed in a medium-sliding surface, and an erase core having a first end portion coupled to said center core and having a second end portion coupled to said center core through an erase gap formed in said medium-sliding surface, a read/write head comprising a closed magnetic circuit comprising said center core and said read/write core integrally constructed with an erase head comprising a closed magnetic circuit comprising said center core and said erase core, wherein the first portion of said erase core coupled to said center core is rougher than the first portion of said read/write core which is coupled to said center core.

9. A magnetic head comprising a center core, a read/write core having a first end portion coupled to said center core and having a second end portion coupled to said center core through a read/write gap formed in a medium-sliding surface, and an erase core having a first end portion coupled to said center core and having a second end portion coupled to said center core through an erase gap formed in said medium-sliding surface, said center core and said read/write core forming a closed magnetic surface comprising a read/write head, said center core and said erase core forming a second closed magnetic circuit comprising an erase head, wherein the contact area of the first end portion of said erase core which is coupled to said center core is smaller than the contact area of the first end portion of said read/write core which is coupled to said center core.

* * * * *